(12) United States Patent
Asl

(10) Patent No.: US 10,963,685 B2
(45) Date of Patent: *Mar. 30, 2021

(54) GENERATING VARIATIONS OF A KNOWN SHRED

(71) Applicant: DST Technologies, Inc., Kansas City, MO (US)

(72) Inventor: Ehsan Hosseini Asl, Berkeley, CA (US)

(73) Assignee: DST Technologies, Inc., Kansas City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/671,698

(22) Filed: Nov. 1, 2019

(65) Prior Publication Data

US 2020/0065573 A1 Feb. 27, 2020

Related U.S. Application Data

(63) Continuation of application No. 15/844,132, filed on Dec. 15, 2017, now Pat. No. 10,515,265.

(60) Provisional application No. 62/439,395, filed on Dec. 27, 2016.

(51) Int. Cl.
| | | |
|---|---|---|
| *G06K 9/66* | (2006.01) | |
| *G06K 9/00* | (2006.01) | |
| *G06K 9/46* | (2006.01) | |
| *G06K 9/62* | (2006.01) | |

(52) U.S. Cl.
CPC ..... *G06K 9/00442* (2013.01); *G06K 9/00422* (2013.01); *G06K 9/46* (2013.01); *G06K 9/62* (2013.01); *G06K 9/6255* (2013.01); *G06T 2207/10* (2013.01)

(58) Field of Classification Search
CPC ...... G06N 3/0454; G06N 3/08; G06K 9/4628; G06K 9/627; G06K 9/00442; G06K 9/00422; G06K 9/6255; G06K 9/46; G06K 9/62; G06T 2207/20081; G06T 2207/10
USPC ......................................... 382/190
See application file for complete search history.

(56) References Cited

U.S. PATENT DOCUMENTS

| | | | | |
|---|---|---|---|---|
| 6,424,738 | B1 * | 7/2002 | Katsumura | G06F 16/58 |
| | | | | 382/165 |
| 7,227,993 | B2 * | 6/2007 | Xu | G06F 3/04883 |
| | | | | 382/179 |
| 2013/0266206 | A1 * | 10/2013 | Albrecht | G06K 9/3216 |
| | | | | 382/154 |
| 2018/0181805 | A1 | 6/2018 | Asl | |

* cited by examiner

*Primary Examiner* — Charlotte M Baker
(74) *Attorney, Agent, or Firm* — Perkins Coie LLP; Brian Coleman

(57) ABSTRACT

Introduced here is a machine learning related technique for supplying an observed model additional training data based upon previously received training data. To determine textual content of a character string based on a digital image that includes a handwritten version of the character string a substantial amount of training data is used. The character string can include one or more characters, and the characters can include any of letters, numerals, punctuation marks, symbols, spaces, etc. Disclosed herein is a technique to determine variations between different images of matching known character strings and substitute those variations into the images in order to create more images with the same known character string.

18 Claims, 25 Drawing Sheets

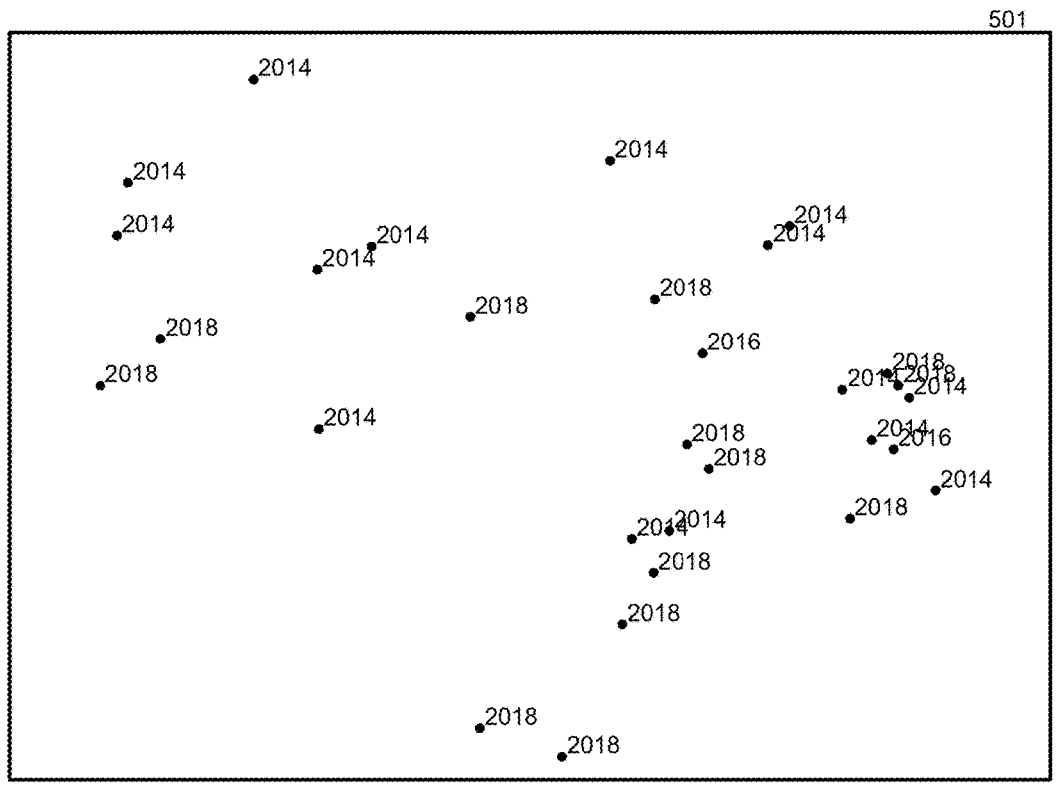
*FIG. 5 (Continued)*

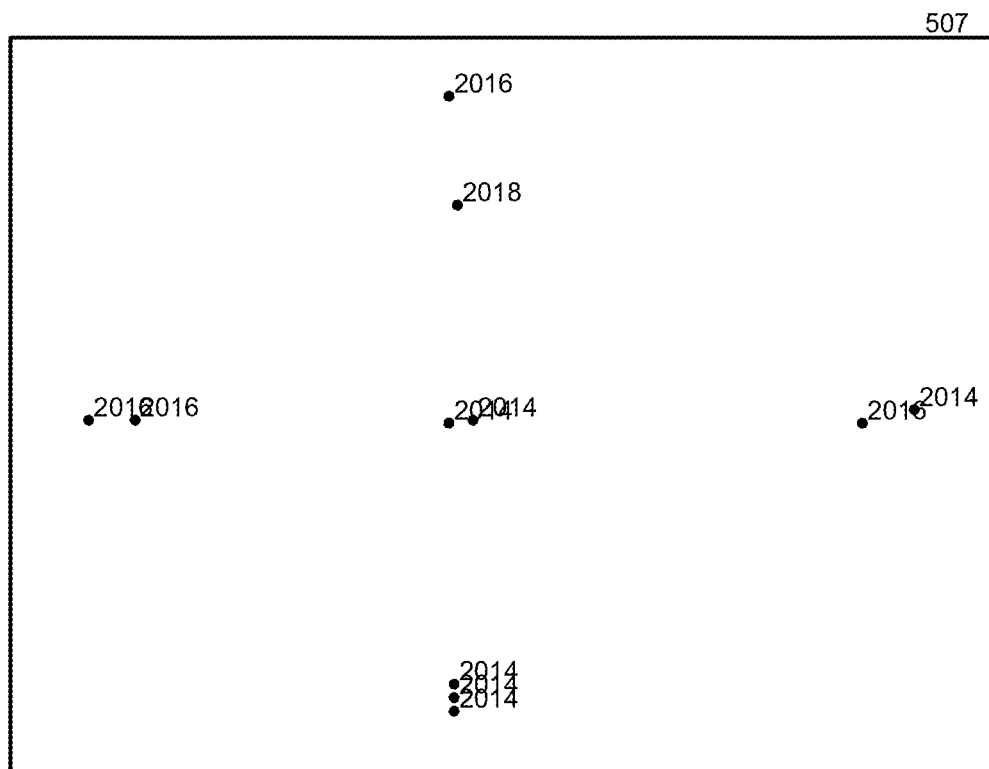
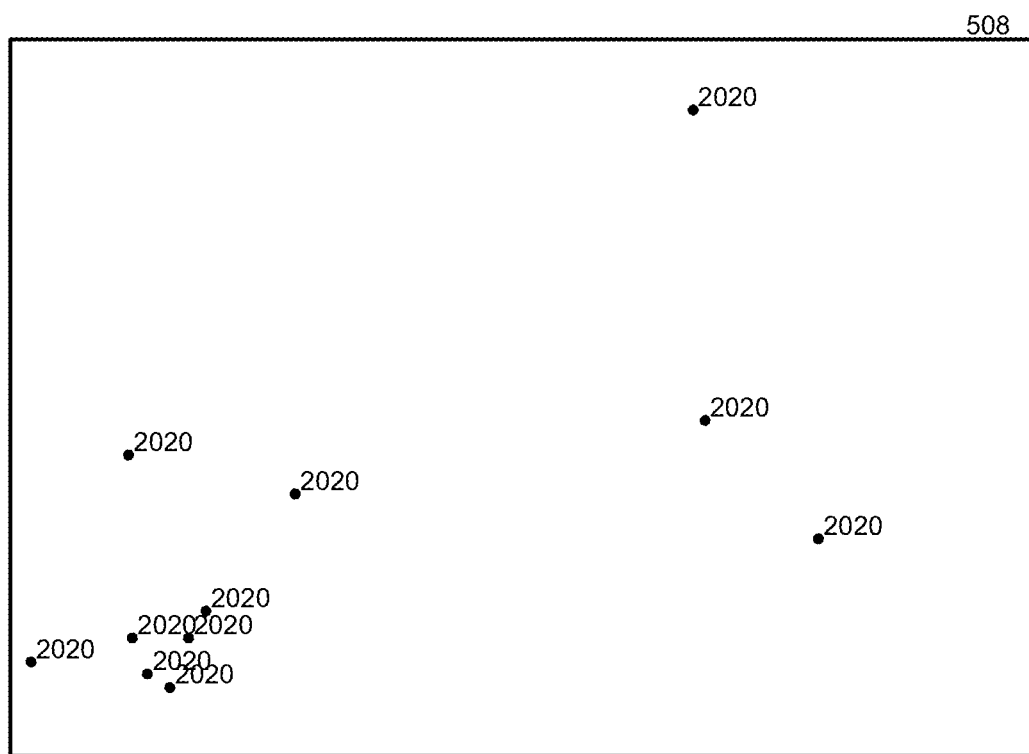
FIG. 5 *(Continued)*

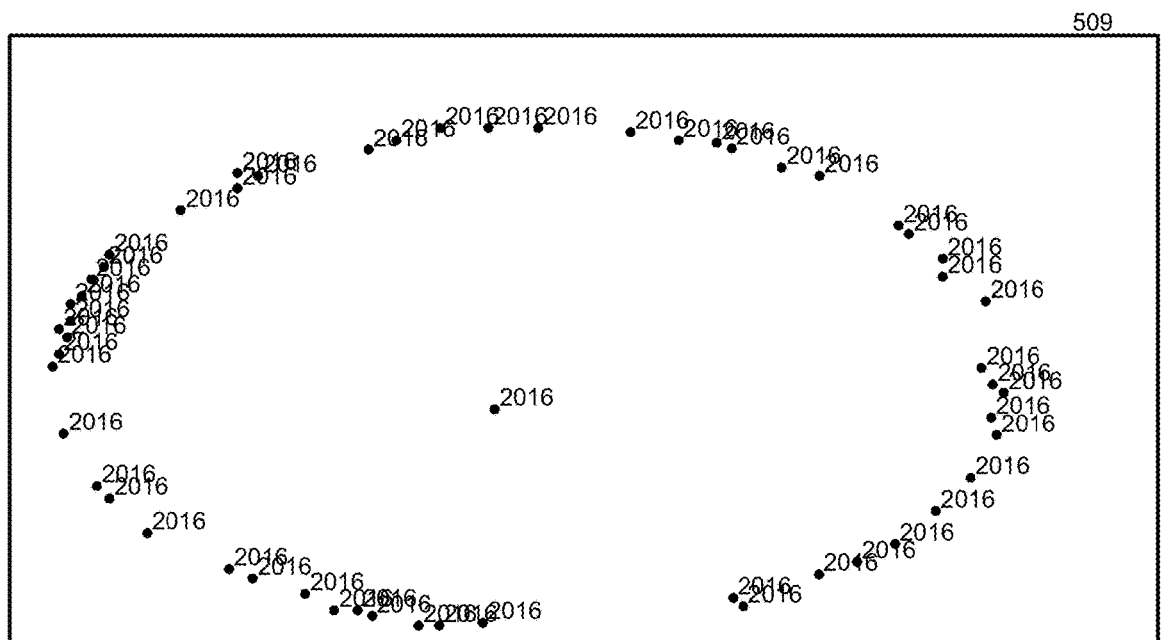
*FIG. 5 (Continued)*

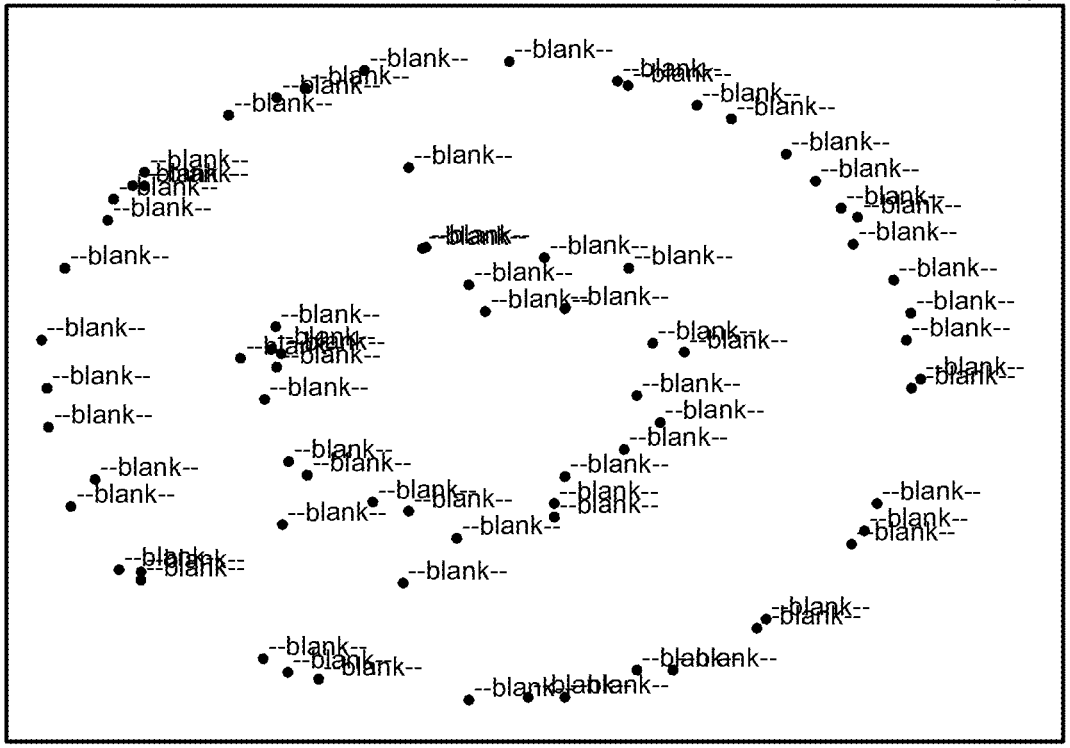
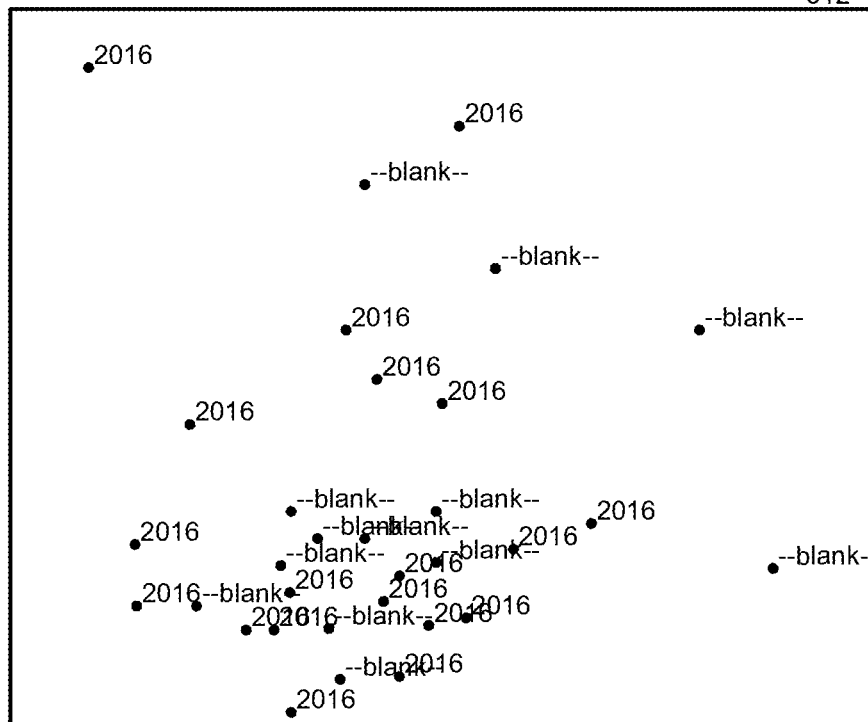
FIG. 5 (Continued)

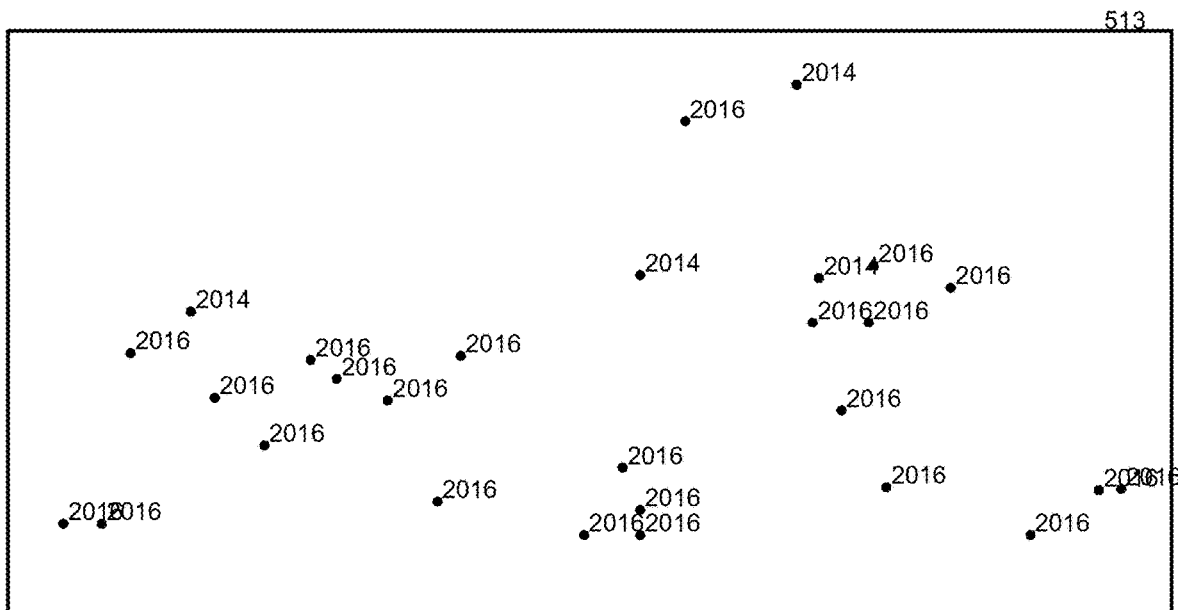
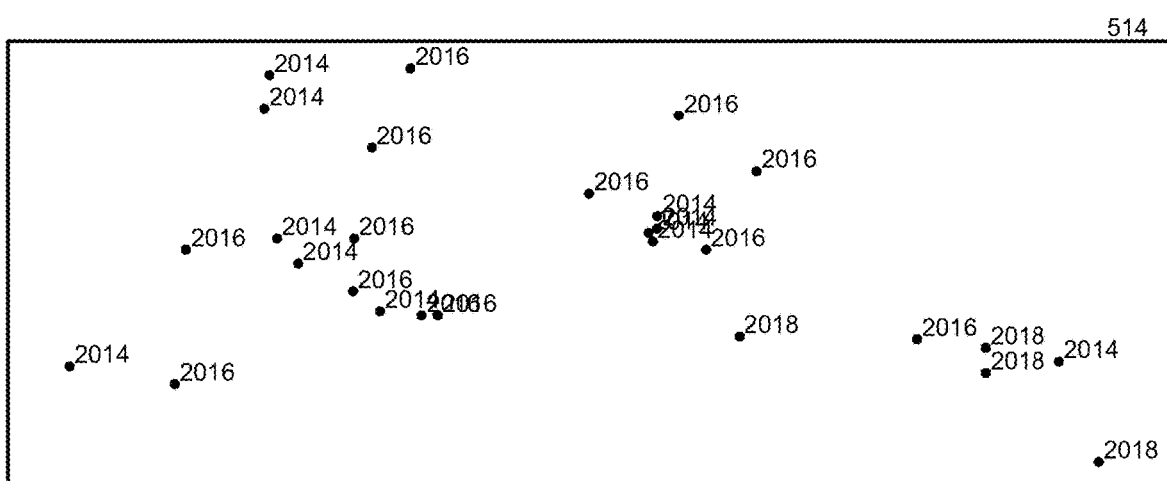
*FIG. 5 (Continued)*

| | Image | Label | Image | Label | Image | Label | Image | Label |
|---|---|---|---|---|---|---|---|---|
| Image | | M | | EL PASO TX | | FOUR SISTERS | | WICHITA, KS |
| Nearest | | blank | | ESPASE, TX | | blank | | Wiehita, KS |
| Image | | La. | | Warwick, R I | | NONE | | Columbus, Ohio |
| Nearest | | blank | | WARWICK, RI | | blank | | Columbus, OHIO |
| Image | | November | | Bridgeport, CT. | | ft. in. | | Bomberz SC |
| Nearest | | blank | | Bridgeport, CT | | blank | | Bomberg SC |
| Image | | 6 ft. 0 in. | | CBJ | | Lung cancer | | Melrose, MA |
| Nearest | | blank | | blank | | blank | | Melrox MA |
| Image | | NewOrleans, LA | | 547 S | | Jamaican Repe | | LITTLEROCK AK |
| Nearest | | NewOrleans LA | | blank | | Dominican Republ | | ultra Rock, AK |
| Image | | respiratory | | 2 sisters. | | Las Vegas, NV | | Oklahoma |
| Nearest | | blank | | 2 sisters | | PS INS Las Vegas, NV | | Oklahoma |
| Image | | stroke | | V | | SIKESTON, MO | | Java |
| Nearest | | blank | | blank | | Sikeston, MO | | Iowa |
| Image | | cancer | | ISSUE | | hartford, ct | | sawaswah,ge |
| Nearest | | blank | | blank | | HARTFORD, CT | | Sawwanah, GA |

*FIG. 6*

Registration Form

Child's Name ⌐ − − − − − − − − − − − − − ¬ Child's Social Security #_____ ← 805

Address:_____ Apt. #____ City_____ State:_____

Zip Code:_____ Home Telephone: ⌐ − − − − − − − − − − − − − − − − ¬ ← 810

Date of Birth:_____ Place of Birth:_____
Birth Certificate Number:_____

Immunization Dates:  Polio_____ DPT_____ Varicella_____
                     HIB_____ HepB_____ MMR_____

If Baptized: Date:_____ Church_____
Church Address:_____

Name of School or Pre-School Child Now Attends:_____
Address:_____ Telephone:_____

FATHER: Name_____ Date/Place of Birth_____
Soc.Sec.#_____ Occupation_____ Work Tel._____
Company Name/Address_____

MOTHER: Name_____ Date/Place of Birth_____
Soc.Sec.#_____ Occupation_____ Work Tel._____
Company Name/Address_____

Parents are: ___ married  ___ single  ___ separated  ___ divorced

EMERGENCY NOTIFICATION: If parents cannot be reached, notify:
Name_____ Tel.#_____ Relation to child:_____

OTHER CHILDREN IN FAMILY. Please list name and date of birth of brothers/sisters, if any:_____

I HEREBY GIVE MY RELEASE AND CONSENT, IN CASE OF AN EMERGENCY, FOR MY CHILD TO BE TREATED BY A DOCTOR OR HOSPITAL EMERGENCY ROOM, IF I CANNOT BE REACHED AT HOME OR AT WORK.
Date:_____ Parent Signature_____

Child's Current Grade:_____ Principal Approval:_____ Date:_____

*FIG. 8*

GENERATING VARIATIONS OF A KNOWN SHRED

CROSS-REFERENCE TO RELATED APPLICATIONS

This application is a continuation of U.S. patent application Ser. No. 15/844,132, filed Dec. 15, 2017, now U.S. Pat. No. 10,515,265, which claims priority to U.S. Provisional Patent Application Ser. No. 62/439,395 filed Dec. 27, 2016. The aforementioned applications are incorporated herein by reference in their entirety.

BACKGROUND

Filling out paper forms is a part of life. A trip to a doctor's office, to the department of motor vehicles (DMV), to an office of a potential new employer, etc., often involves filling out a paper form. Such forms have fields for people to provide information, such as a field for a person's name, another for his address, yet another for his phone number, etc. An employee of the doctor, the DMV, etc. often electronically captures the information entered on the form by manually entering the information into a computer. Once electronically captured, the information can be added to a database, a spreadsheet, an electronic document, etc., where the information can be stored for future reference.

BRIEF DESCRIPTION OF THE DRAWINGS

One or more embodiments are illustrated by way of example in the figures of the accompanying drawings, in which like references indicate similar elements.

FIG. 6 is an illustration of text strings with High Confidence False Negative (HCFN) error.

FIG. 8 is an illustration of a blank school registration form, consistent with various embodiments.

DETAILED DESCRIPTION

Figure 1:
FIG. 1 is an illustration that includes examples of text strings and shreds with the same textual content, consistent with various embodiments

Optical Character Recognition (OCR) is traditionally used to convert images of machine printed text into textual content. Intelligent Character Recognition (ICR) is used to do the same for images of handwritten text. State-of-the-art OCR engines can work well, for example, when the data is clean and where the OCR engine can be adjusted to deal with a single font or a small set of fonts. State-of-the-art ICR engines are not as capable as state-of-the-art OCR engines. Resultantly, today's ICR engines may not be sufficiently capable for many real-life applications.

It is desirable to have a system that can covert images of handwritten character strings into textual content with very low error rates, e.g., ≤0.5%, while minimizing the amount of necessary human labeling.

Introduced here is technology related to determining textual content of a character string based on a digital image that includes a handwritten version of the character string. The character string can include one or more characters, and the characters can include any of letters, numerals, punctuation marks, symbols, spaces, etc. "Character string" and "text string" are used interchangeably herein. In an example, a patient fills out a form at a doctor's office by writing responses in fields of the form. The patient writes his last name in a "Last Name" field, writes his birthday in a "Birthday" field, etc. A staff member creates a digital image of the form, such as by scanning or photographing the form. In an experiment, the staff member attempts to run OCR software, as well as ICR software, on the digital image to determine the responses entered in the fields by the patient. The staff member is disappointed when he discovers that neither the OCR software nor the ICR software reliably recognizes the hand-written characters.

Utilizing the technology introduced here, the staff member is able to utilize a computer to analyze the digital image of the form and determine the responses written in the fields by the patient. A shred is digital data, such as a digital file, that includes an image of a portion of a document, such as an image of a filled out field of a form, an image of a portion of a filled in field of a form, an image of the entire form, etc. For example, a shred can include an image of a filled out "State" field of a form, an image of a filled out "Date" field of a form, an image of a single character of the field, such as a letter, number, punctuation mark, etc. The portion can include a symbol, such as an "=", an "$", an "%", etc. A shred can include any or all of the characters/symbols/etc. that are written or otherwise entered into a field of a form.

A library of known shreds is initially created. An initial set of known shreds can be created by one or more persons who manually visually analyze unknown shreds. Introduced here is technology for automatically generating variations of a known shred. The known shred can be a shred from an existing dataset, a manually generated shred, a shred determined utilizing the techniques of the current disclosure, or through various other means.

As discussed, an initial set of known shreds can be obtained from an existing dataset of shreds, such as MNIST data (MNIST data, made available by Yann LeCun et. al., is available at http://yann.lecun.com/exdb/mnist/). Alternately, or additionally, known shreds can be determined manually, and via a technique of the current disclosure.

To manually generated known shreds, a person, such as the staff member, a resource from a workforce marketplace, such as a person from Amazon's® Mechanical Turk online work marketplace, etc., views a shred. The person determines the textual content that is represented by the shred, such as the last name of a patient when the shred includes an image of the filled in "Last Name" field, or a letter of the last name of a patient when the shred includes an image of the filled in "Last Name" field that contains a single character of the person's last name. The person inputs the contents of the shred via a computer, and the computer associates the textual content with the shred. For example, when a shred includes an image of the filled in contents of a "State" field of a form, and a person manually determines that the textual content of the field is "Washington", the person inputs "Washington" as the textual content of the shred, and "Washington" is associated with the shred. As a second example, when a shred includes an image of an equal sign (i.e., "="), the person inputs "=" as the textual content of the shred, and "=" is associated with the shred.

By using the MNIST data, by performing the above-described manual process for a number of shreds, or via other techniques, an initial set of known shreds can be created where each of the shreds is associated, such as via a database, with a character string (e.g., letter(s), number(s), punctuation mark(s), geometric symbol(s), word(s), etc.) that represents the textual content of the shred.

The technology introduced here enables an initial known shred to be used to automatically generate variations of the known shred to approximate possible variations in real-world handwriting style of the shred. A machine learning tool can train on the initial set of shreds. By analyzing a number of known shreds that each contain a same character, the machine learning tool can "learn" about variations in handwriting style for the character. Using this learning, the machine learning tool can take a known shred, and, by applying this learning, can automatically generate variations in the handwriting style of the character(s) in the shred, and can generate variations of the initial shred that mimic the variations in the handwriting styles that were observed in the initial set of known shreds. Utilizing these techniques, a library of known shreds can be created, with some of the shreds being the initial known shreds, and other shreds being the automatically generated versions of some or all of these initial known shreds.

Once the library of shreds is compiled, the computer determines a set of visual features for a shred from the library, and associates the visual features of the shred with the shred, such as via the database. The computer repeats this process of determining and associating the visual features for each of the shreds of the library.

The staff member utilizes the technology introduced here to analyze a document, such as a particular form that was filled out by a patient. The staff member creates a digital image of the particular form, and sends the digital image to the computer. The computer identifies a shred of the particular form, referred to in this example as the "new shred," and determines visual features, also referred to herein as "features", of the new shred, such as vertical lines, horizontal lines, slanted lines, arcs, etc. The computer then runs an analysis that utilizes the visual features of the new shred to determine a library shred from the library that is visually similar to the new shred. For example, when the new shred includes an image of a filled out "State" field of a form, and the computer determines that the new shred is visually similar to a library shred that is associated with the textual content "Washington", the computer determines that the textual content of the new shred is "Washington". It is noteworthy that this determination is made without performing OCR or ICR, which is advantageous because it enables the textual content of a shred (also referred to herein as the "content" of a shred) to be determined, even when OCR or ICR is not able to determine the content of the shred.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Further, in this description the term "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Additionally, in this description any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

Learning Text Similarity

FIG. 1 is an illustration that includes examples of text strings and shreds with the same textual content, consistent with various embodiments. For example, text string 115 has a textual content of "277." Shreds 105 and 110 are shreds that include handwritten images of text with the same textual content, e.g., both shred 105 and shred 110 are images of handwritten versions of "277".

Figure 2:
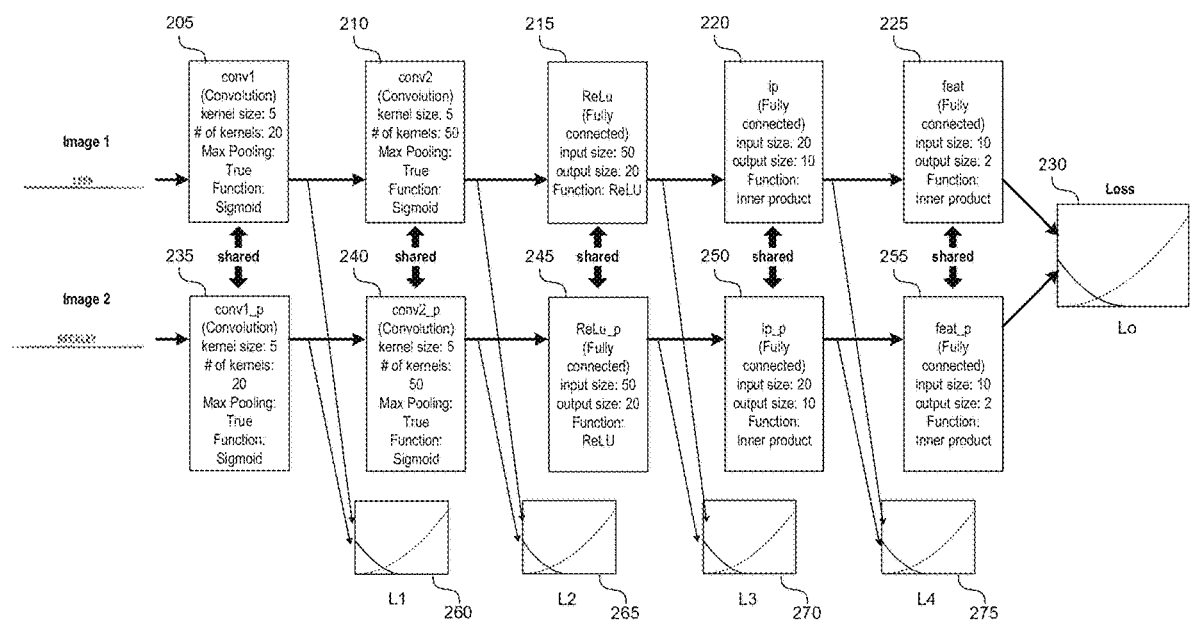
FIG. 2 is a diagram that illustrates a Deeply Supervised Siamese Network (DSSN) for learning similarities of text strings, consistent with various embodiments.

FIG. 2 is a diagram that illustrates a Deeply Supervised Siamese Network (DSSN) for learning similarities of text strings, consistent with various embodiments. An algorithm, such as DSSN, can be utilized to recognize text strings without the need for character-segmented data. Character-segmented data is the output of character segmentation, which is an operation that decomposes an image of a sequence of characters into sub-images of individual symbols. In other words, character-segmented data are the sub-images of individual symbols that are output during character segmentation.

In some embodiments, a Siamese Convolutional Network is used to map variable-size text images into a fixed-size feature space that preserves similarity between inputs, and that induces a similarity/distance metric between different text images. This, in turn, allows for the development of a k-nearest neighbor algorithm for text prediction. To train a model to be able to learn the similarity between text strings, a Siamese network is used, such as the Siamese network of: Sumit Chopra et al., *Learning a similarity metric discriminatively, with application to face verification*, Computer Vision & Pattern Recognition (IEEE Computer Soc'y Conf.

2005); or Raia Hadsell et al., *Dimensionality Reduction by Learning an Invariant Mapping*, 2 Proceedings IEEE Computer Soc'y Conf. on Computer Vision & Pattern Recognition 1735-42 (2006).

The Siamese network of this example is trained to project the images into a feature space, where similar images are projected with short mutual Euclidean distance, and dissimilar images are projected with large mutual Euclidean distances. Training of the Siamese network is based on minimizing the contrastive loss of a pair of images, $$L(W) = (1-Y) * \frac{1}{2}D_w^2 + \frac{1}{2} * Y * \max(0, m - D_w)^2 \quad (1)$$

where $W=\{\{w^0, \ldots, w^n\}, w^o\}$ are the weights of the hidden layers and output layer of the Siamese network, Y is the label of paired images, i.e., 0 if similar and 1 if dissimilar, $D_w$ is the Euclidean distance between a pair of images, and m is the desired Euclidean distance between a pair of dissimilar images.

Experiments have shown that using a single loss function in the output layer of a Siamese network does not reliably capture similarities between long handwritten text strings. The performance of contrastive loss L is dependent on feature extraction of the hidden layers, where it should capture the similarities in a hierarchical way, to enable the output layer to extract features which can clearly represent the similarities of long and complex text strings. In order to boost the performance of the Siamese network for learning similarity of long text strings, a method of deep supervision, such as the method of Chen-Yu Lee et. al., *Deeply-Supervised Nets*, https://arxiv.org/abs/1409.5185 (submitted Sep. 25, 2014), can be utilized. In such a deep supervision method, several contrastive loss functions are used for hidden and output layers, to improve the discriminativeness of feature learning, as illustrated in FIG. 2 where "LEER" and "BECKLEY" are being processed by a DSSN algorithm.

The disclosed technique, DSSN, is trained in this example using the combined contrastive loss, $$L_{DSSN}(W) = \sum_{l=0}^{n} L_l(w^{(l)}) + L_o(w^p) \quad (2)$$

where l indicates the index for hidden layer, and o is the output layer. Eq. 2 indicates that the loss $L_l$ of each hidden layer is the function of only weights of that layer, i.e., $w^{(l)}$. The DSSN generates a Similarity Manifold, where similar text strings are projected with short mutual Euclidean distances. The next section describes the text strings recognition model based on the Similarity Manifold. The ADADELTA method of gradient descent, as described in Matthew D. Zeiler, *Adadelta: An adaptive learning rate method*, https://arxiv.org/abs/1212.5701, (submitted Dec. 22, 2012), is used to update the parameters of DSSN in this example.

Text Recognition by Text Similarity

This section discloses a text string recognition framework to predict the label of text using the DSSN model developed in the previous section. Labeling, as applied to a shred, such as a shred that includes an image of a character string, is the operation of determining the textual content of the shred or the image of the character string. In other words, when a person or machine labels a shred or an image of a character string, the person or the machine determines the textual content of the shred or the character string.

Figure 3A:
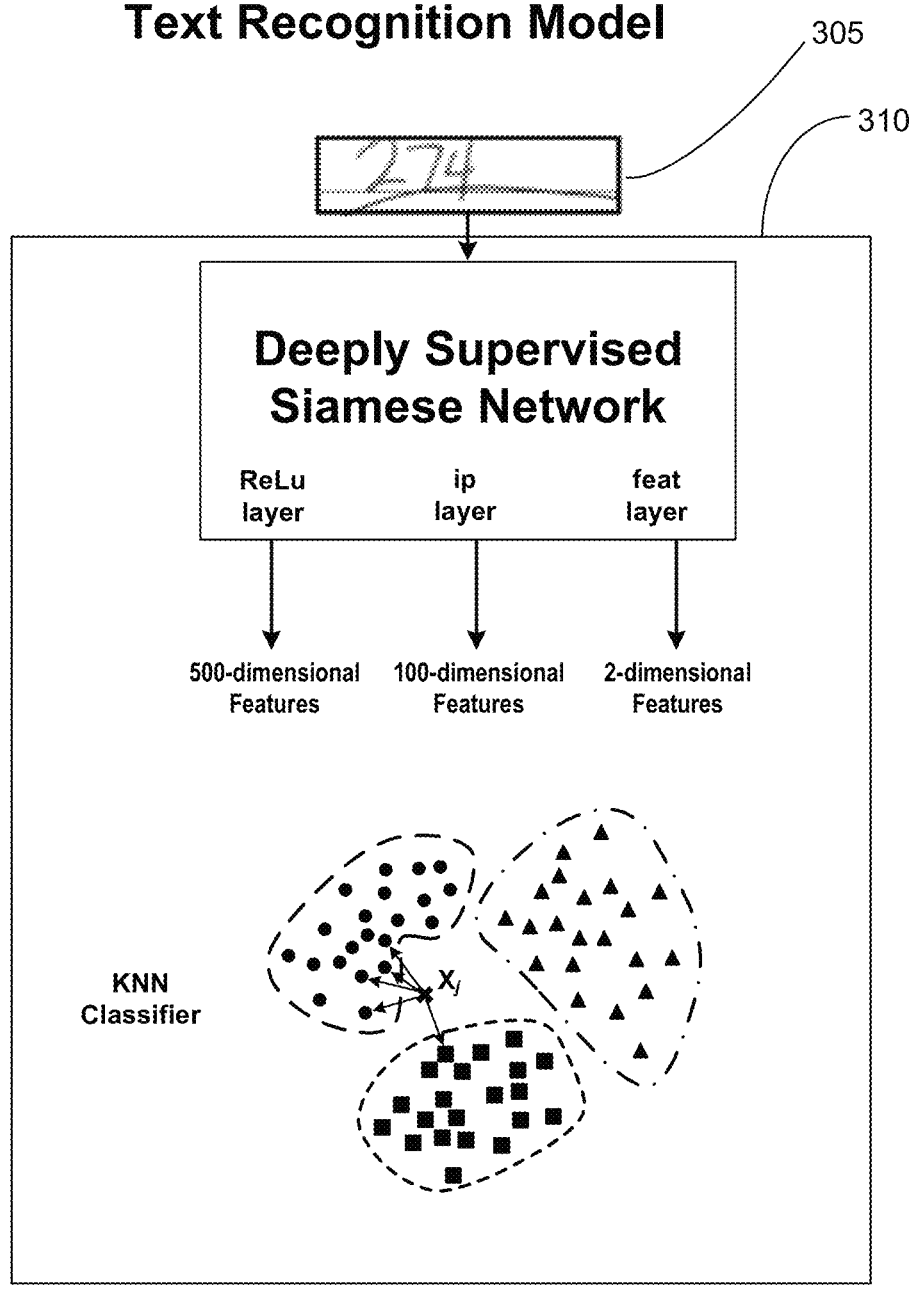
FIGS. 3A-C are illustrations of a framework for text recognition, consistent with various embodiments.
Figure 3B:
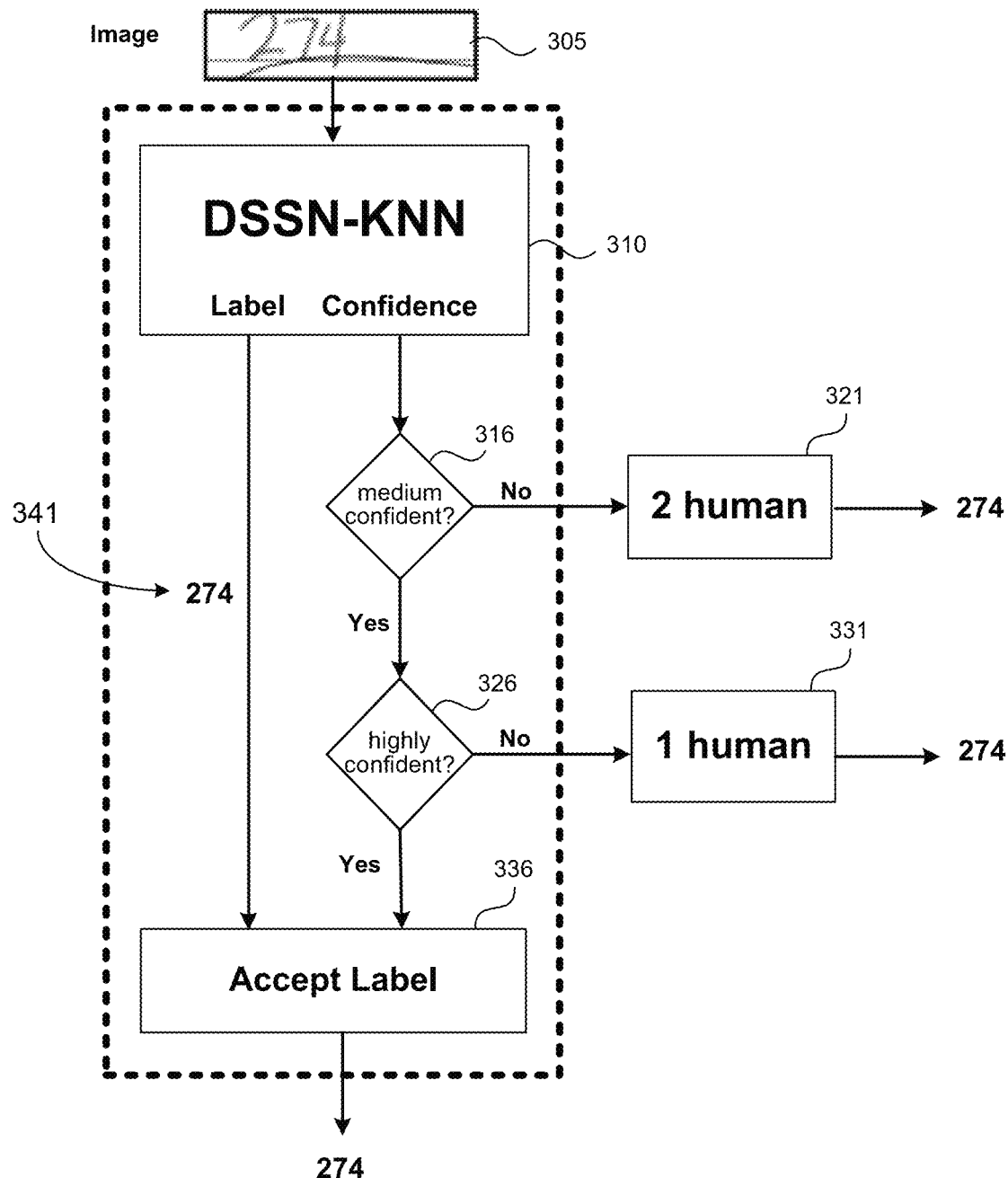

In some embodiments, a text recognition model is based on feature extraction of text using DSSN, as is represented by block 310 of FIGS. 3A and 3B, which represent, respectively, a text recognition model and a text recognition framework, consistent with various embodiments. As is represented in block 310, a K-nearest neighbor (kNN) algorithm is utilized to predict the label of text images in test data, based on similarity distance to the labeled text in train data. As shown in FIG. 3B, the predicted label can be compared with human.

Figure 3C:
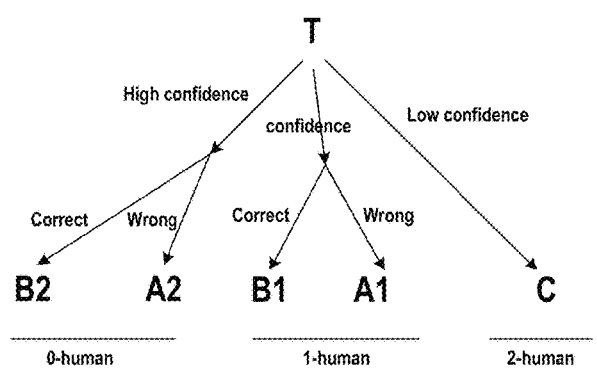

In some embodiments, a human-assisted model for text label prediction is utilizes the voting of one or more humans on a text image. The text image can be a shred, such as shred 305 of FIGS. 3A and 3B, which is an image of a handwritten version of the text string "274". The framework of FIGS. 3A-C is motivated by a goal of reducing the cost of human estimations while maintaining a low error rate, such as an error rate of <0.5%. As shown at block 310 of FIG. 3B, the predicted label of DSSN-KNN, label 341, with the textual content value of "274" in this example, is accompanied by a confidence value. Two parameters are chosen, $\theta_1$ and $\theta_2$, such that the confidence value can be classified as highly confident, medium confident, or not confident. If the model's prediction confidence is high (i.e., confidence is $>\theta_2$, block 316=Yes and block 326=Yes), the label is accepted at block 336, and no human estimation is done. When the prediction is not confident (i.e., confidence<$\theta_1$, block 316=No), the predicted label of DSSN-KNN is validated with two human estimations (block 321). When the prediction is medium confident (i.e., confidence>$\theta_1$ and <$\theta_2$, block 316=Yes and block 326=No), the predicted label of DSSN-KNN is validated with one human estimation (block 331). The parameters $\theta_1$ and $\theta_2$ are chosen by tuning the model's performance on the training set (or one can use a validation set).

To measure the performance of DSSN-KNN in reducing the human estimation, we define an efficiency metric as represented by equation 307 of FIG. 3C, which is reproduced here, $$\text{efficiency} = \frac{\frac{A_1 + B_1}{2} + A_2 + B_2}{T}$$

where T is the total number of text samples, $A_1$ and $B_1$ are the number of medium-confident wrong and medium-confident correct predictions, and $A_2$ and $B_2$ are the number of high-confident wrong and high-confident correct predictions, respectively.

Note that the efficiency metric definition implicitly assumes a low rate of disagreement between two humans labeling the same image or between a human and the DSSN-KNN model. If this rate is 1% (which is what we see in practice, see AC column in Table 4), the metric will over count the reduction in the required number of human estimates by ~1%. In the case of disagreement, extra human estimates will be needed to resolve conflicts.

The DSSN-KNN model can be used in one of two modes: ROBOTIC and ASSISTIVE. ROBOTIC mode is suggested by FIG. 3B—(i) for high confidence predictions, human labeling is skipped, (ii) for medium confidence predictions, human confirmation is obtained and (iii) for low confidence predictions, the prediction is discarded and at least two human estimates are obtained.

ASSISTIVE mode is to ignore $\theta_2$ (high confidence threshold)—(i) for high and medium confidence predictions, human confirmation is obtained and (ii) for low confidence predictions, the prediction is discarded and at least two human estimates are obtained.

ASSISTIVE mode can result in zero error, or very nearly zero error, from the DSSN-KNN model. But efficiency is lower because $\{A,B\}_2$ are folded into $\{A;B\}_1$ in the numerator of equation 307 of FIG. 3C. On the other hand, ROBOTIC mode has higher efficiency at the cost of some DSSN-KNN errors unchecked by humans. The techniques disclosed herein are developed to achieve an error of under 0.5%.

EXPERIMENTS

In this section, several experiments for evaluating the performance of the disclosed techniques for recognizing text strings are described. The DSSN-KNN model is pre-trained on MNIST data (MNIST data, made available by Yann LeCun et. al., is available at http://yann.lecun.com/exdb/mnist/), and then fine-tuned on the datasets to minimize the loss function of Eq. 2. A mini-batch size of 10 paired texts is selected to train the Similarity manifold. The 10 paired texts include 5 similar pairs and 5 dissimilar pairs. Caffe and Theano are used on Amazon EC2 g2.8×large instances with GPU GRID K520 for the following experiments. (See Yangqing Jia et. al., *Caffe: Convolutional Architecture for Fast Feature Embedding*, https://arxiv.org/abs/1408.5093, submitted Jun. 20, 2014; and Frederic Bastien et. al., *Theano: new features and speed improvements*, https://arxiv.org/abs/1211.5590, submitted Nov. 23, 2012). Some metrics are initially applied to evaluate the performance of DSSN in learning the Similarity Manifold, as described below in the Similarity Manifold Evaluation section below. In the Text Recognition Evaluation section below, the performance of DSSN-KNN is evaluated for text recognition of three hand-written text datasets.

Similarity Manifold Evaluation

In order to evaluate the performance of DSSN for text recognition, the trained similarity manifold is evaluated for detecting similar and dissimilar texts. For this purpose, two separate experiments are implemented, one for non-numeric texts and a second for numeric texts.

The non-numeric dataset contains 8 classes, where two major classes dominate in sample count. During the evaluation, we found that most of the human-labeled 'blanks' are actually not blank, and contain some text from the two major classes. This misclassified text in training data hurts the performance of DSSN.

Figure 4A:
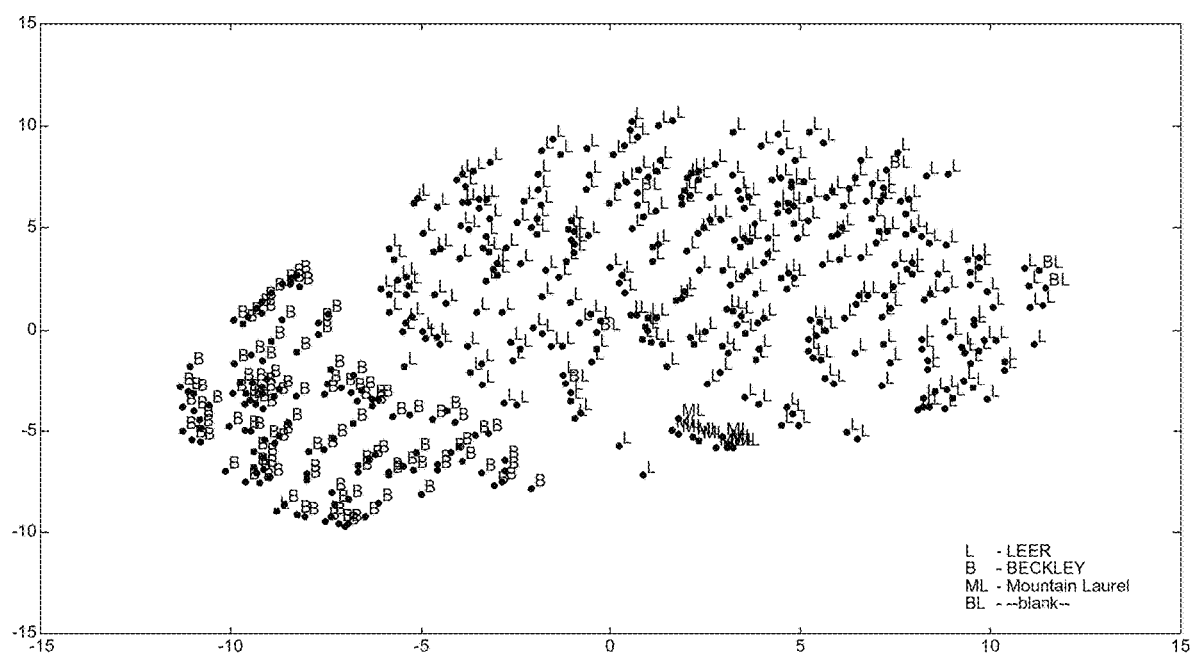
FIGS. 4A and B are similarity manifold visualizations of machine-printed non-numeric text in (4A) hidden and (4B) output layer, using t-SNE projection, consistent with various embodiments.
Figure 4B:
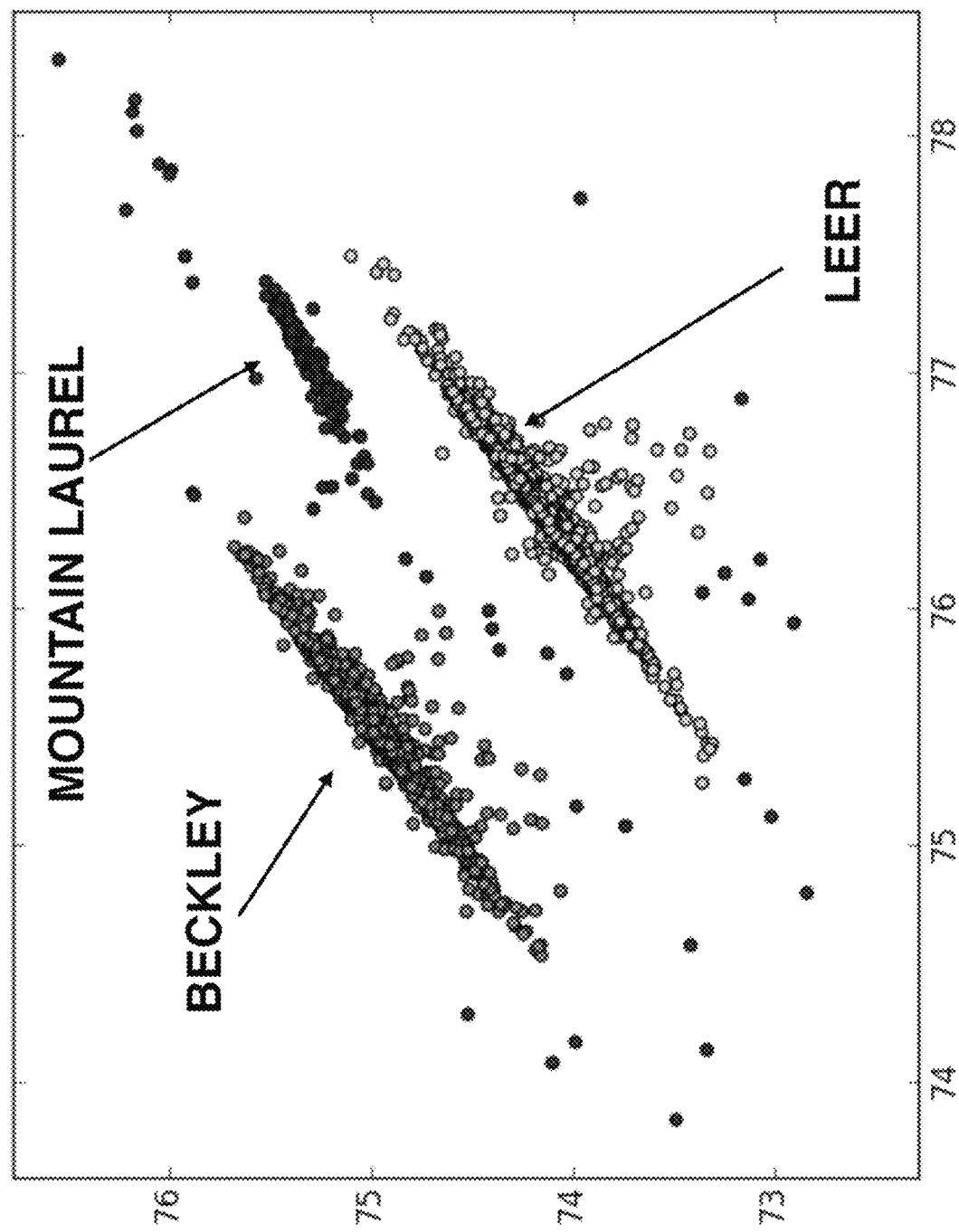
Figure 5:
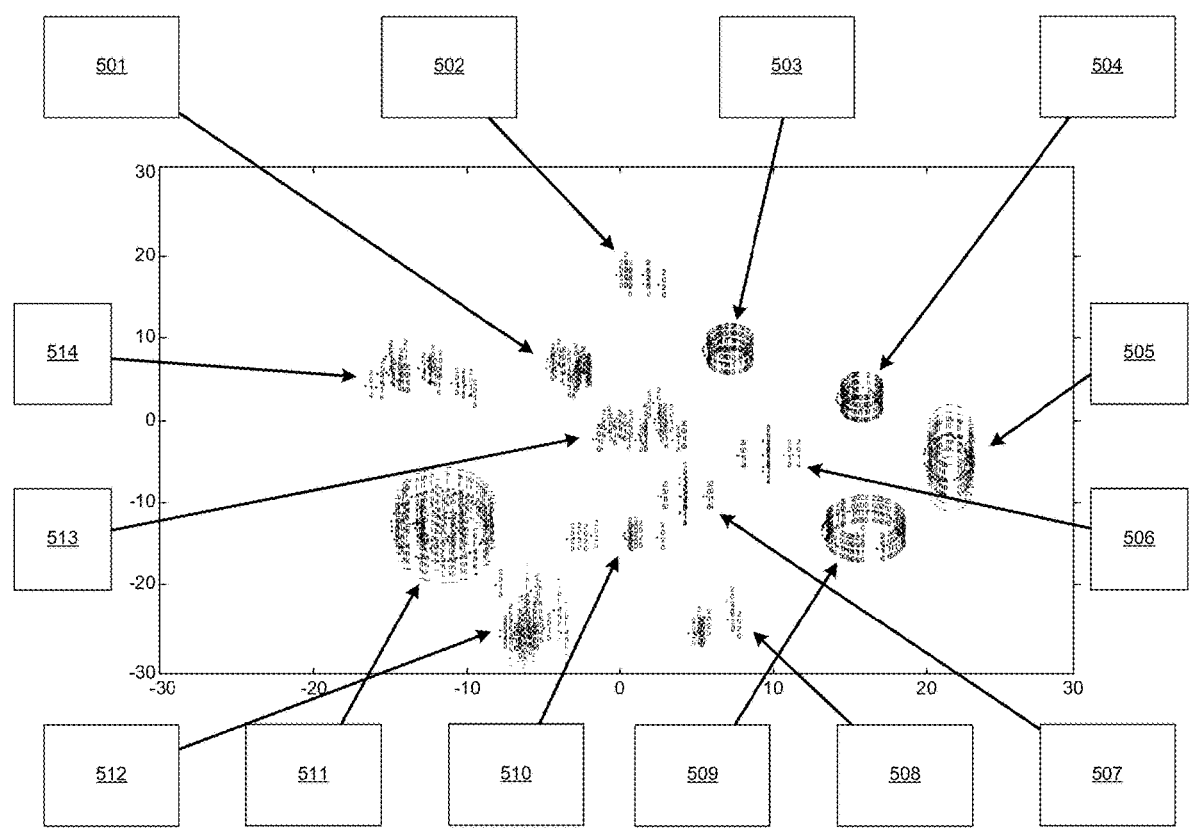
FIG. 5 is a similarity manifold visualization of machine-printed non-numeric text using t-SNE projection, consistent with various embodiments.
Figure 5:
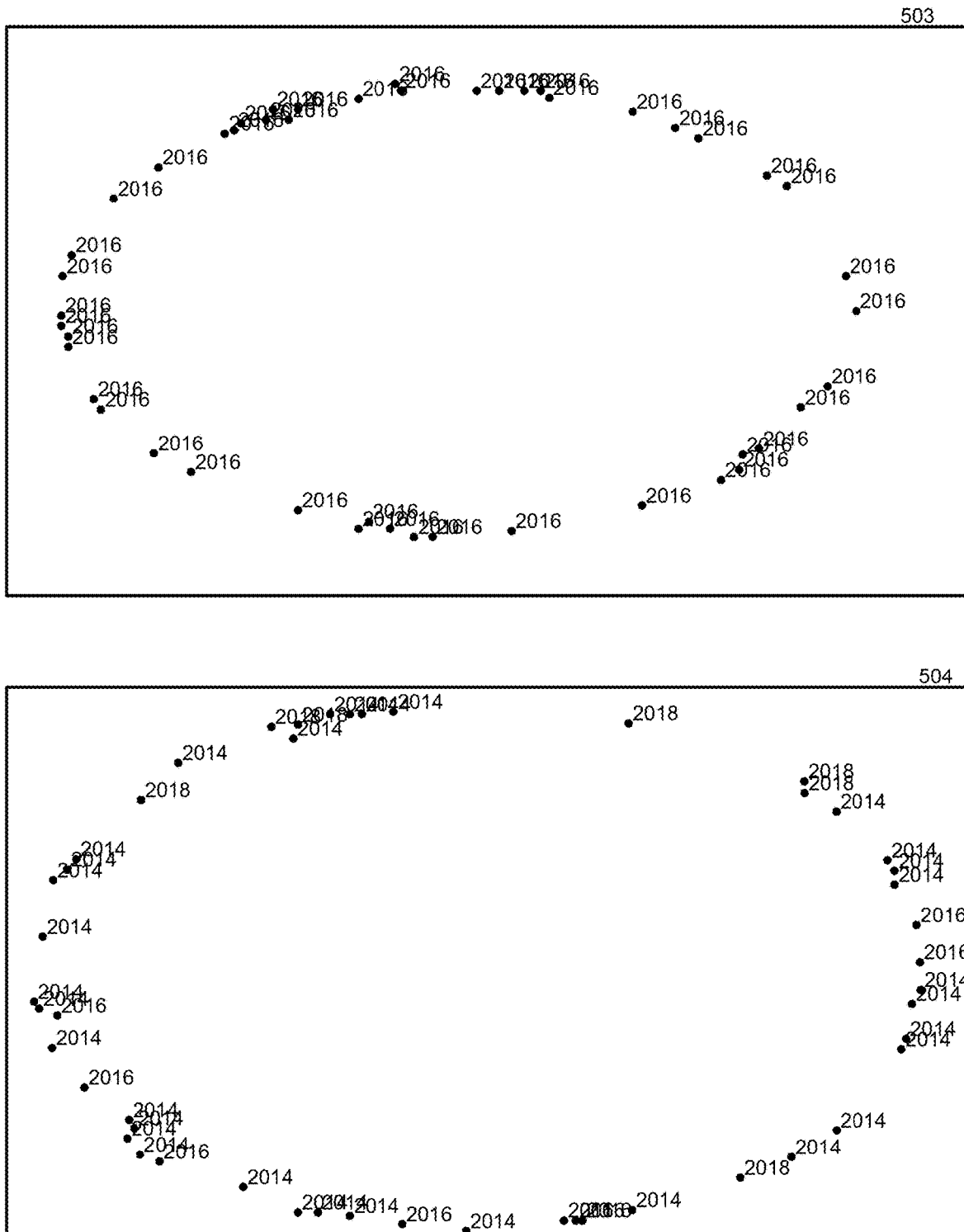
Figure 5:
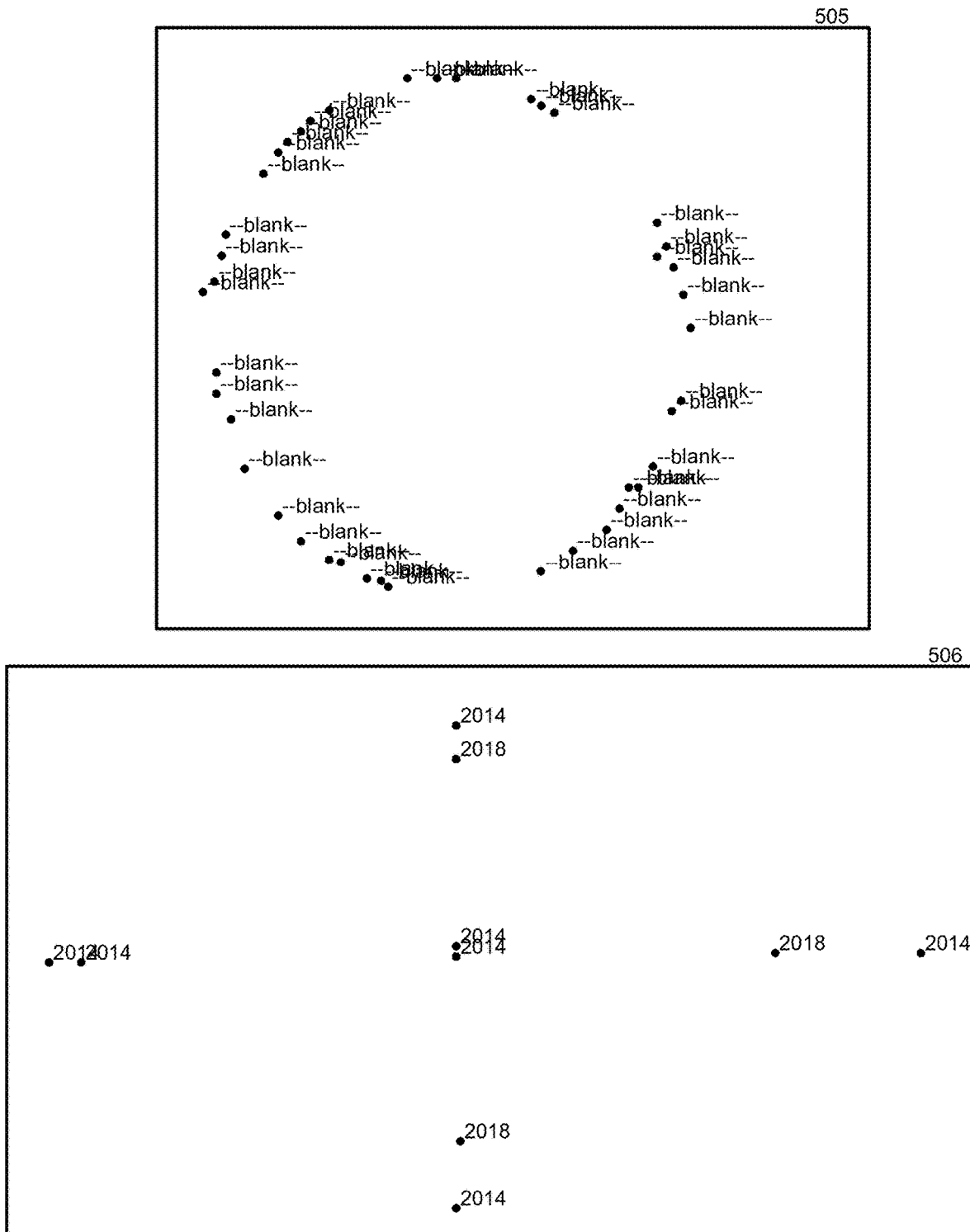

To investigate the distribution of text in the similarity manifold, the feature spaces of hidden layers and output layer are visualized in FIG. 4 and FIG. 5. FIGS. 4A and 4B are similarity manifold visualizations of machine-printed non-numeric text in (4A) hidden and (4B) output layer, using t-SNE projection. (See Van Der Maaten et. al., *Visualizing Data using t-SNE*, Journal of Machine Learning Research, 9(2579-2605):85, http://www.jmlr.org/papers/v9/vandermaaten08a.html, 2008).

FIGS. 4A and 4B show the visualization of texts based on the 50- and 20-dimensional features extracted in 'conv2' and 'ReLu' layers. The visualizations demonstrate that the three major classes are well-separated, e.g., 'LEER, "BECKLEY' and 'Mountain Laurel'. FIG. 5 is a similarity manifold visualization of machine-printed non-numeric text using t-SNE projection. FIG. 5 depicts the distribution of all texts in 'feat' layer, where each of regions 501-514 are expanded for better visualization. Accordingly, some boxes contain texts belonging to only one class, e.g., 502, 503, 505, 508, 509, 510, 511. The '2014' class is mixed with other classes of '2018' and '2016', as shown in boxes 501, 504, 506, 507, 513. The 'blank' shreds in box 512 which are combined with '2016' texts are mis-labeled texts—reducing the clustering performance of the DSSN model.

In order to evaluate the similarity manifold, several random pairs of images are selected from the test set and feed-forwarded through the DSSN. Then, the Euclidean distance between the paired images is computed based on the output of 'feat' layer. A decision threshold, $\theta$, is chosen such that $0{:}9*FN+0.1*FP$ is minimized over the training set. Here FP is the false positive rate (similar images predicted as dissimilar) and FN is the false negative rate (dissimilar images predicted as similar). FN is weighed more than FP because the former increases efficiency at the cost of accuracy while the latter does not hurt accuracy. Table 1 shows the results for the model initialized by MNIST data, and after fine-tuning on the training dataset.

TABLE 1

Similarity prediction in Similarity manifold based on Euclidean Distance

| DSSN | FN | FN | Error |
|---|---|---|---|
| Pretrained by MNIST | 21.63% | 7.58% | 14.60% |
| After Fine-tuning | 4.61% | 1.89% | 3.25% |

TABLE 2

Text Clustering evaluation in Similarity manifold of different layers of DSSN in machine-printed texts

| | Adjusted Rand Index | | |
|---|---|---|---|
| Dataset Type | feat layer | ip layer | ReLu layer |
| non-numeric text | 0.91 | 0.95 | 0.95 |
| numeric text | 0.96 | 0.93 | 0.96 |

To further evaluate the similarity manifold, a clustering algorithm is applied on texts and the clustered texts are evaluated based on truth labels. For this test, parallel networks of DSSN are not needed. The extracted features from hidden and output layers for clustering of the text are used. Several clustering algorithms were implemented: K-means, spectral clustering, DBSCAN and agglomerative clustering. To have a better evaluation of features in each layer, we applied clustering algorithms on the features of the 'ReLu', 'ip', and 'feat' layers. The number of clusters for K-means and spectral clustering were set to 8. For DBSCAN and Agglomerative algorithms, the number of clusters was based on the similarity distance between text samples. The clustering performance is measured using Adjusted Rand Index. (See Lawrence Hubert et. al., *Comparing partitions*, Journal of Classification, 1985, Volume 2, Number 1, Page 193, https://www.researchgate.net/publication/24056046_Comparing_Partitions; and see William M. Rand et. al., *Objective criteria for the evaluation of clustering methods*, Journal of the American Statistical Association, 66.336 (1971): 846-850, http://www.tandfonline.com/doi/abs/10.1080/01621459.1971. Ser. No. 10/482,356). Table 2 shows the best clustering algorithm performance, which was agglomerative clustering on 3 layers of DSSN network.

Text Recognition Evaluation

In the above Similarity Manifold Evaluation section, the similarity manifold learned by DSSN was evaluated for clustering and similarity prediction. This section focuses on performance of the proposed DSSN-KNN framework, as shown in FIGS. 3A and 3B for text recognition. The trained DSSN model was tested on three difficult hand-written datasets. These datasets included hand-written and machine printed text with many variations of translation, scale and image patterns for each class. The number of texts and unique classes in each dataset are listed in Table 3.

The text recognition performance of DSSN-KNN on the three datasets is listed in Table 5, where the reduction in human estimation is computed. The performance of DSSN-KNN is measured by Accuracy (AC), Accuracy of DSSN-KNN High-Confidence predicted labels (HCAC), Accuracy of medium-confident predicted labels validated by a human (HVAC), False Negative labels (FN), and High-Confidence False Negatives (HCFN). In order to select the confidence and high-confidence thresholds ($\theta_1$ and $\theta_2$) for each dataset, a grid search over the two thresholds to minimize High Confidence False Negative (HCFN) was done. The chosen thresholds for each dataset and the error values are shown in Table 4.

Some of the text images where DSSN-KNN produces high confidence errors are shown in FIG. 6, which is a listing of text strings with HCFN error. FIG. 6 includes text strings where DSSN-KNN produce high confidence wrong prediction, and includes the nearest neighbor text string in Similarity Manifold chosen by kNN. It is evident that most of the example pairs are, in fact, mutually visually similar, and the "errors" can be attributed to human errors in their estimations of the test strings. Interestingly, DSSN-KNN sometimes predicts better-than-human labels, for example, when a human estimation includes a spelling error.

Experiment Conclusions

The results show that the average value of human-less efficiency on successful field is: 25-45% in ASSISTIVE mode with NO error, and 50-85% in ROBOTIC mode with <0.5% error. Observed errors are explainable. Predicted labels are sometimes better than human labels e.g., spell corrections. Some of the false negative errors we count are in whitespace and irrelevant punctuation (the "real" error is lower than reported here).

TABLE 3

Hand-written text image datasets.

| | Total data | Train Data | Test Data |
|---|---|---|---|
| Dataset#1 (Short text - Unit) | | | |
| No. of Images | 90010 | 72008 | 18002 |
| No. of Labels | 1956 | 1722 | 827 |
| No. of Unique Labels | 1956 | 1129 | 234 |
| No. of blank Images | 50592 | 40517 | 10075 |
| Dataset#2 (Short text - Non-Numeric) | | | |
| No. of Images | 89580 | 71664 | 17916 |
| No. of Labels | 1612 | 1321 | 459 |
| No. of Unique Labels | 1612 | 1153 | 291 |
| No. of blank Images | 84143 | 67309 | 16834 |
| Dataset#3 (Short text - Numeric and Non-Numeric) | | | |
| No. of Images | 89461 | 71568 | 17893 |
| No. of Labels | 3124 | 2540 | 792 |
| No. of Unique Labels | 3124 | 2332 | 584 |
| No of blank Images | 82864 | 66328 | 16534 |

TABLE 4

Text recognition performance on each dataset with respect to and to achieve HCFN ≤ 0.5%.

| | $\theta_1$ | $\theta_2$ | efficiency | AC | HCAC | HVAC | FN | HCFN |
|---|---|---|---|---|---|---|---|---|
| Dataset#1 | | | | | | | | |
| DSSN ROBOTIC | 0.94 | 0.99 | 0.8731 | 0.99 | 0.99 | 0.98 | 0.00407 | 0.0027 |
| DSSN ASSISTIVE | 0.95 | 1 | 0.45 | 0.99 | — | 0.99 | 0.0039 | 0 |
| Dataset#2 | | | | | | | | |
| DSSN ROBOTIC | 0.94 | 0.99 | 0.8585 | 0.99 | 0.99 | 0.98 | 0.0030 | 0.0016 |
| DSSN ASSISTIVE | 0.95 | 1 | 0.45 | 0.99 | — | 0.99 | 0.0029 | 0 |
| Dataset#3 | | | | | | | | |
| DSSN ROBOTIC | 0.94 | 0.99 | 0.5013 | 0.99 | 0.99 | 0.98 | 0.0049 | 0.0033 |
| DSSN ASSISTIVE | 0.95 | 1 | 0.27 | 0.99 | — | 0.99 | 0.0047 | 0 |

TABLE 5

Human-less estimation using proposed DSSN-KNN text recognition model.

| | | | Human-less efficiency | |
| Dataset | Type | No. of labeled Images | ROBOTIC | ASSISTIVE |
| --- | --- | --- | --- | --- |
| Dataset #1 | machine & hand | 18002 | 8196/1659(50.31%) | 9789(27.19%) |
| Dataset #2 | machine & hand | 17916 | 14739/1808(87.31%) | 16475(45.98%) |
| Dataset #3 | machine & hand | 17893 | 14509/1706(85.85%) | 16130(45.07%) |

Figure 7A:
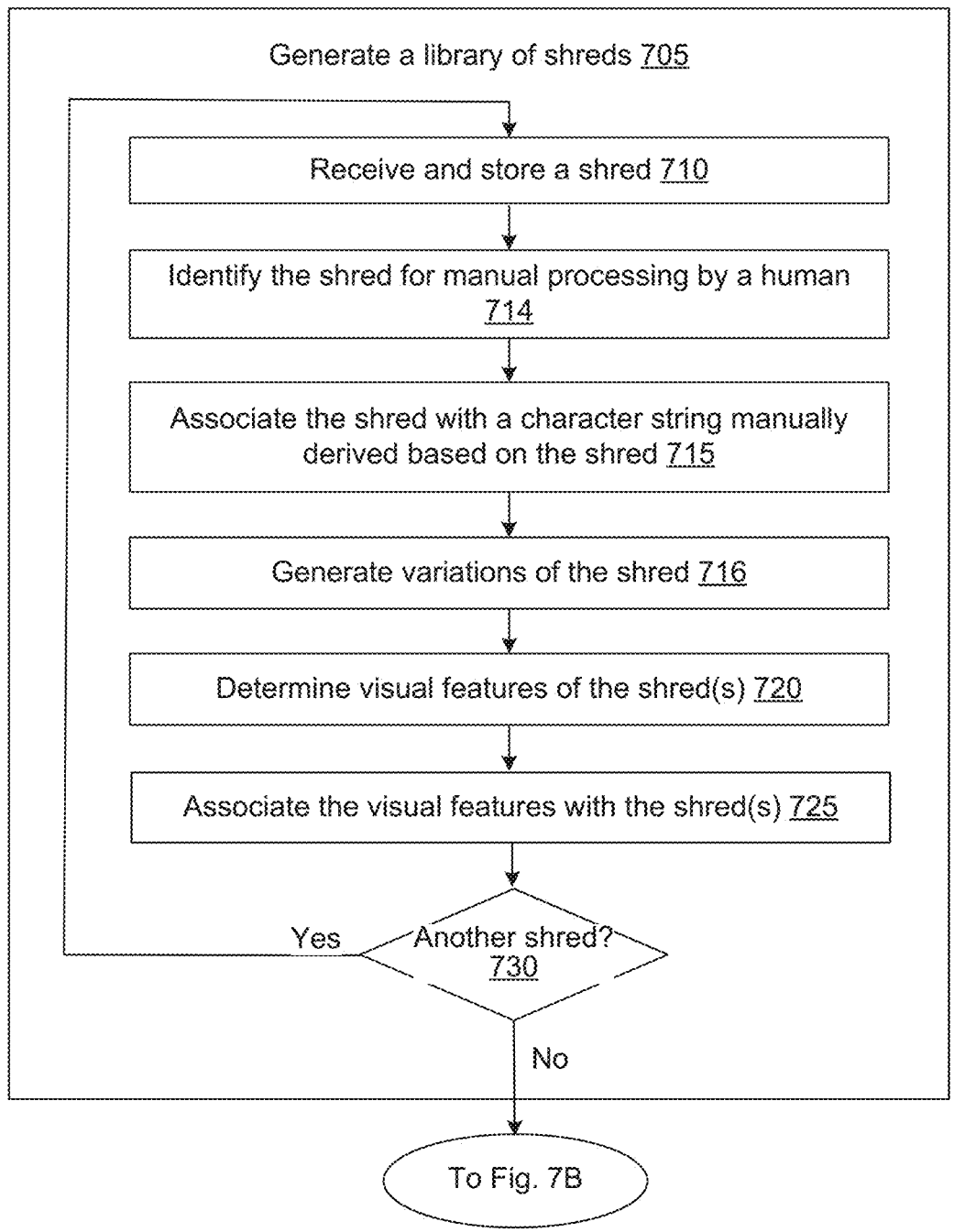
FIGS. 7A-C are flow diagrams illustrating an example process for determining a character string based on visual features of a shred, consistent with various embodiments
Figure 7B:
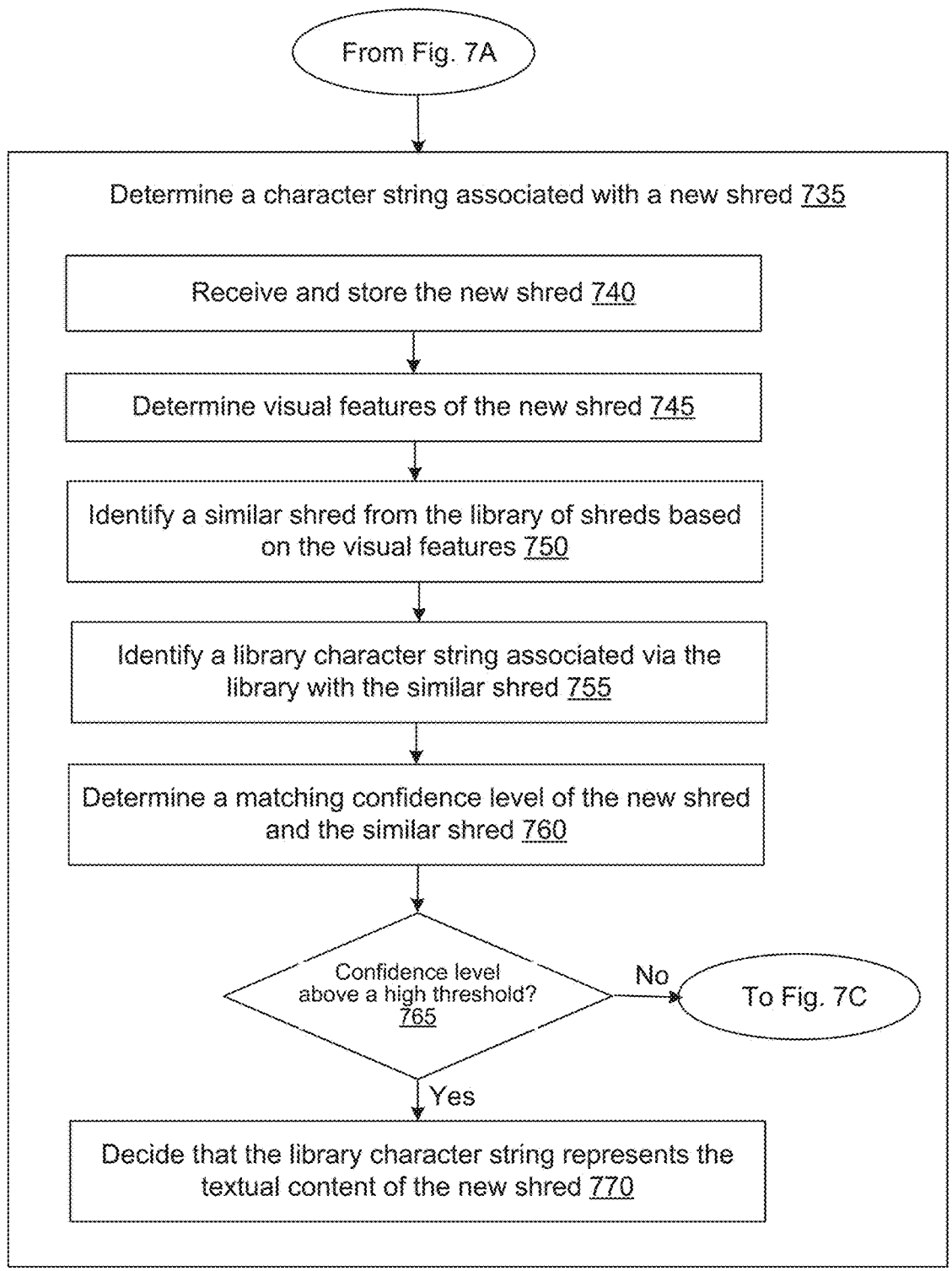
Figure 7C:
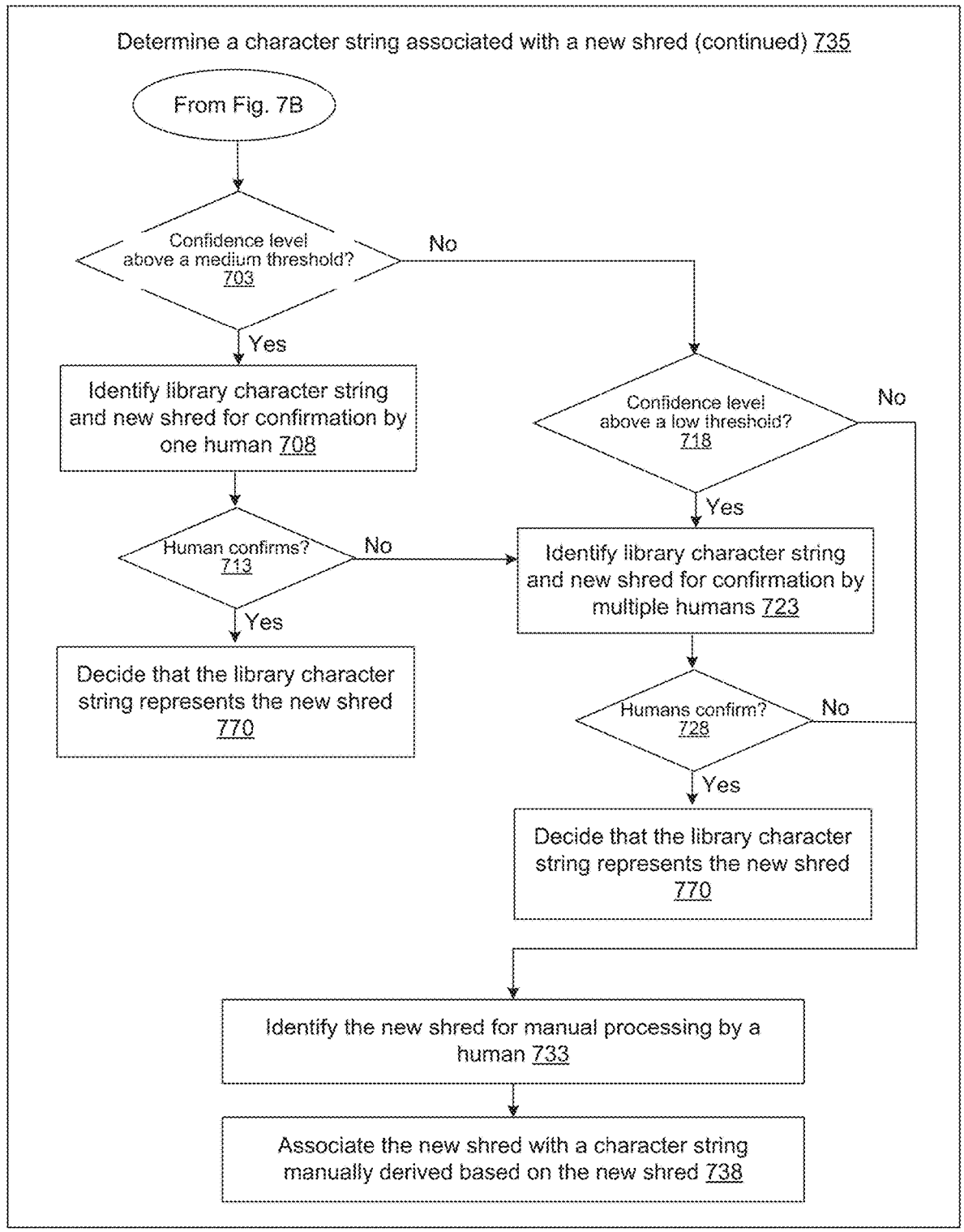

FIGS. 7A-C are a flow diagram illustrating an example process for determining a character string based on visual features of a shred, consistent with various embodiments. In some cases, a visual feature is a keypoint. The example process begins with the generation of a library of shreds (block 705). A shred is digital data that includes an image of a portion of a document. A shred can be generated in any of various ways. For example, a shred can be obtained from a data set, such as the MNIST data set. In an example where the portion of the document is the entire document, a shred can be a digital image of an entire document, such as document 800 of FIG. 8. Such a shred can be generated by scanning the document, by taking a photo of the document, etc. In another example where the portion of the document is a filled in field of a document, a shred is an image of the filled in field of a document.

A field is a space on a form for an item of information to be entered, such as by being written or typed in the field. For example, document 800 includes a number of fields. Two such examples are fields 805 and 810, which are fields where a child's parent, when filling out document 800, would write in his or her child's name (field 805), and their home telephone number (field 810). A computer system can extract a portion of the image of document 800 that corresponds to, e.g., field 805, and generate a shred that includes an image of the portion of the document that corresponds to field 805, such as the area represented by the dashed lines. In some embodiments, a computer system generates a shred for each field of a document, and each shred includes an image of its corresponding field.

A computer system receives a shred, such as from a scanner/camera/etc. coupled to the computer, from another computer that generated the shred based on an image acquired by a scanner/camera/etc., from a known data set, such as the MNIST data set, etc., and stores the shred (block 710). When the shred is a digital file, the file can be stored at storage that is coupled to the computer system, such as a disk drive, flash memory, network attached storage, a file system, a file server, etc. In some embodiments, the computer system generates the shred by extracting a portion of a document that corresponds to a filled-in field of the document.

When the shred is not a known shred, the computer system identifies the shred for manual processing by a human (block 714). For example, the computer system can tag the shred for manual processing, can send the shred to an online workforce marketplace for manual processing, etc. During manual processing, a human views the shred and manually inputs a character string that represents the textual content of the shred, which the human determines by visually looking at the image of the shred. The computer system then associates the shred with the character string manually derived based on the shred (block 715). For example, the shred can be shred 305 of FIG. 3A. When a human views the image of shred 305, the human determines that the textual content of shred 305 is "274" and inputs "274." The computer system then associates shred 305 with character string "274", which represents the textual content of shred 305 as was manually determined by the human. The association can be via any of various ways, such as via a database, via an association stored in a file, an excel spreadsheet, etc. In some embodiments, the computer system generates variations of the shred (block 716). The variations of the shred can be generated utilizing, for example, the technique of FIGS. 9-12.

The computer system determines visual features of the shred(s) (block 720). The computer system can execute any of various visual feature extractors to determine the visual features of the shred. Examples of visual feature extractors include Deeply Supervised Siamese Network (DSSN), Scale Invariant Feature Transform (SIFT), Speeded Up Robust Features (SURF), or Oriented Features from Accelerated Segment Test and Rotated Binary Robust Independent Elementary Features (ORB), among others. Some visual feature extractors enhance a feature of an input image by convolving a portion of the input image with a filter. The mathematical concepts of convolution and the kernel matrix are used to apply filters to data, to perform functions such as extracting edges and reducing unwanted noise. See, e.g., Sung Kim & Riley Casper, Univ. of Wash., *Applications of Convolution in Image Processing with MATLAB* (Aug. 20, 2013), http://www.math.washington.edu/~wcasper/math326/projects/sung_kim.pdf. Examples of filters include a Sobel filter, which creates an image that emphasizes edges, and a Gaussian smoothing filter, which 'blurs' an image, resulting in reduced detail and noise.

In some embodiments, the computer system executes multiple feature extractors. For example, the computer system can execute multiple convolutions, each applying a different filter to extract a different set of features, or can execute ORB and also execute convolution applying a particular filter, etc. Each of the different sets of features can be vectorized to create a feature vector, also referred to as a visual feature vector.

The computer system associates the visual features with the shred(s) (block 725), such a via a database. Associating the visual features with the shred(s) can include associating multiple sets of visual features with the shred(s), where each set of visual features is extracted by a different visual feature extractor, can include associating one or more visual feature vectors with the shred(s), etc. In some embodiments, the computer system determines clusters of visual features by executing a clustering algorithm, such as a k-means algorithm or an unsupervised learning algorithm. The clustering algorithm can be executed on visual features extracted by a single visual feature extractor, can be executed on multiple sets of visual features, each set being extracted by a different visual feature extractor, or can be executed on one or more feature vectors. In some embodiments, associating the visual features with the shred(s) can include associating the clusters of visual features with the shred(s). In some embodiments, the computer system determines a bag of visual words for the shred(s) based on the clusters of visual features of the shred. In some embodiments, associating the visual features with the shred(s) can include associating the bag of visual words with the shred(s).

Once the shred(s) is(are) processed for inclusion in the library of shreds, the computer system determines whether another shred is awaiting processing for the library. If yes (block 730=yes), the computer system receives and stores the next library shred (block 710) and processed the next library shred for inclusion in the library of shreds. If no (block 730=no), the library is initially ready for use. At any time after the library is initially ready, additional shreds can be added to the library in a similar fashion.

At block 735, the computer system determines a character string associated with a new shred. The computer system receives and stores the new shred (block 740), and determines visual features of the new shred (block 745). Blocks 740 and 745 are substantially similar to, respectively, blocks 710 and 720. Based on the visual features, the computer system identifies a similar shred from the library of shreds (block 750). In some embodiments, a similar shred is identified by comparing the visual features of the library shred and the visual features of the new shred. The comparison can include executing a matching algorithm, such as a matching algorithm that is based on area-based alignment, feature-based alignment, etc., and the new shred and a library shred can be considered a match when the results of the matching algorithm indicate a match. In some embodiments, the new shred is determined to match a library shred when the matching algorithm indicates a match above or within a pre-defined confidence level.

In some embodiments, a similar shred is identified by executing a classifier to classify the visual features of the new shred, and determining if a library shred is similarly classified. In such embodiments, rather than determining a similar shred by comparing visual features of the new shred to visual features of a library shred, a similar shred is identified by classifying visual features of the new shred, and determining if a library shred is similarly classified. If the classification of the visual features of the new shred is similar to the classification of the visual features of a library shred, the two shreds are considered a match, and the library shred is determined to be a similar shred to the new shred. In some embodiments, to be considered a match, the classification of the visual features of the new shred needs to match the classification of the visual features of the library shred above or within a pre-defined confidence level. Examples of classifiers include a k-nearest neighbor algorithm, a SIFT classifier, a SIFT-ORB ensemble classifier, an ORB classifier, and a WORD classifier.

The computer system identifies a character string associated with the similar shred (block 755) that represents the textual content of the similar shred, such as the character string that was associated with the similar shred at block 715 when the similar shred was processed for inclusion in the library of shreds. Based on being associated with a library shred that is similar to the new shred, the character string of block 755 may also accurately represent the textual content of the new shred. The computer system determines a confidence level of the matching of the new shred and the similar shred (block 760). The confidence level can be based on, among others, results of executing a matching algorithm that compares the visual features of the new shred and the similar shred, can be based on comparison of the classification of the visual features of the new shred and the classification of the visual features of the similar shred.

When the confidence level of block 760 is above a predetermined high threshold (block 765=yes), the computer system determines that the new shred and the similar shred match. Based on the determination that the new shred and the similar shred match, the computer system determines that the character string of block 755 represents the textual content of the new shred (block 770), and associates the character string with the new shred.

When the confidence level of block 760 is below the predetermined high threshold (block 765=no), the computer system determines whether the confidence level is above a predetermined medium confidence level (block 703). When the confidence level is below the predetermined medium confidence level (block 703=no), the computer system determines whether the confidence level is above a predetermined low confidence level (block 718). When the confidence level is below the predetermined low confidence lever (block 718=no), the computer system identifies the new shred for manual processing by a human (block 733), and associates the new shred with a character string manually derived based on the new shred (block 738). Blocks 733 and 738 are, respectively, substantially similar to blocks 714 and 715. In some embodiments, the new shred is processed for inclusion in the library of shreds, and variations of the new shred can be generated, such as via the technique of FIGS. 9-12.

When the confidence level of block 760 is above the predetermined medium confidence level (block 703=yes), the computer system identifies the character string of block 755 and the new shred for confirmation by one human (block 708). Because the confidence level of block 760 is not above the predetermined high confidence threshold, but is above the predetermined low confidence threshold, a manual check is to be performed to verify whether the character string of block 755 does accurately represent the textual content of the new shred. Further, because the confidence level of block 760 is above the predetermined medium confidence level, the computer system decides to identify the character string of block 755 and the new shred for confirmation by one human (block 708). For example, the computer system can tag the new shred and the character string of block 755 for manual checking, can send the new shred and the character string of block 755 to an online workforce marketplace for manual checking, etc.

During manual checking, a human views the new shred and the character string of block 755, and indicates, such as by clicking a "same" or a "different" icon, whether the character string of block 755 accurately represents the textual content of the new shred (block 713). When the human determines that the character string of block 755 accurately represents the textual content of the new shred (block 713=yes), the computer system decides that the library character string of block 755 accurately represents the new shred (block 770), and associates the character string with the new shred.

When the human determines that the character string of block 755 does not accurately represent the textual content of the new shred (block 713=no), the computer system identifies the library character string of block 755 and the new shred for confirmation by multiple humans (block 723). Because the confidence level of block 760 is above the predetermined medium confidence threshold, and because the human check of block 713 was negative, a manual check is to be performed by multiple humans to verify whether the character string of block 755 does accurately represent the textual content of the new shred. Block 723 is substantially similar to block 708, except that the confirmation is performed by multiple humans rather than one human. If a predetermined threshold of humans confirm that the character string of block 755 accurately represents the textual content of the new shred (block 728=yes), the computer system decides that the library character string of block 755 accurately represents the new shred (block 770), and associates the character string with the new shred. The predetermined threshold of block 728 can be all of the multiple humans, a majority of the multiple humans, or any ratio between 50% and 100%.

If a predetermined threshold of humans do not confirm that the character string of block 755 accurately represents the textual content of the new shred (block 728=no), the computer system identifies the new shred for manual processing by a human (block 733), and associates the new shred with a character string manually derived based on the new shred (block 738). In some embodiments, the new shred is processed for inclusion in the library of shreds.

When the confidence level is above the predetermined low confidence level (block 718=yes), the computer system identifies the library character string of block 755 and the new shred for confirmation by multiple humans (block 723). Because the confidence level of block 760 is between the predetermined medium confidence threshold and the predetermined low confidence threshold level, a manual check is to be performed by multiple humans to verify whether the character string of block 755 does accurately represent the textual content of the new shred. If a predetermined threshold of humans confirm that the character string of block 755 accurately represents the textual content of the new shred (block 728=yes), the computer system decides that the library character string of block 755 accurately represents the new shred (block 770), and associates the character string with the new shred.

FIGS. 9-12 disclose a technique for automatically generating variations of a known shred. The technique can be used, for example, to generate a library of shreds, such as via the method of FIG. 7 to generate a library of shreds (block 705).

Figure 9:
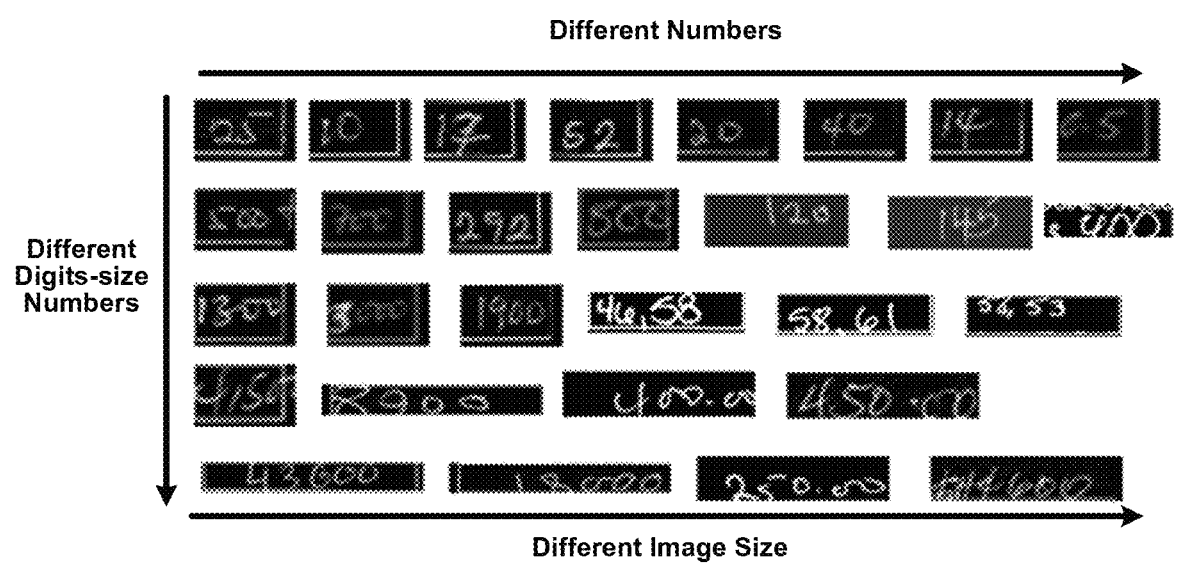
FIG. 9 is an illustration of numeric text data, consistent with various embodiments.

FIG. 9 is an illustration of numeric text data, or shreds, consistent with various embodiments. The dataset of FIG. 9 includes numbers with variable length, variable dimension, different handwritten style, etc. Objectives of the dataset can be to provide examples of variations in handwriting styles of numeric characters, to provide a dataset for a machine learning tool to analyze to be able to derive a model of variations in handwriting style of various numerals, etc. Similar datasets can be obtained or determined for any of various sets of characters.

Figure 10:
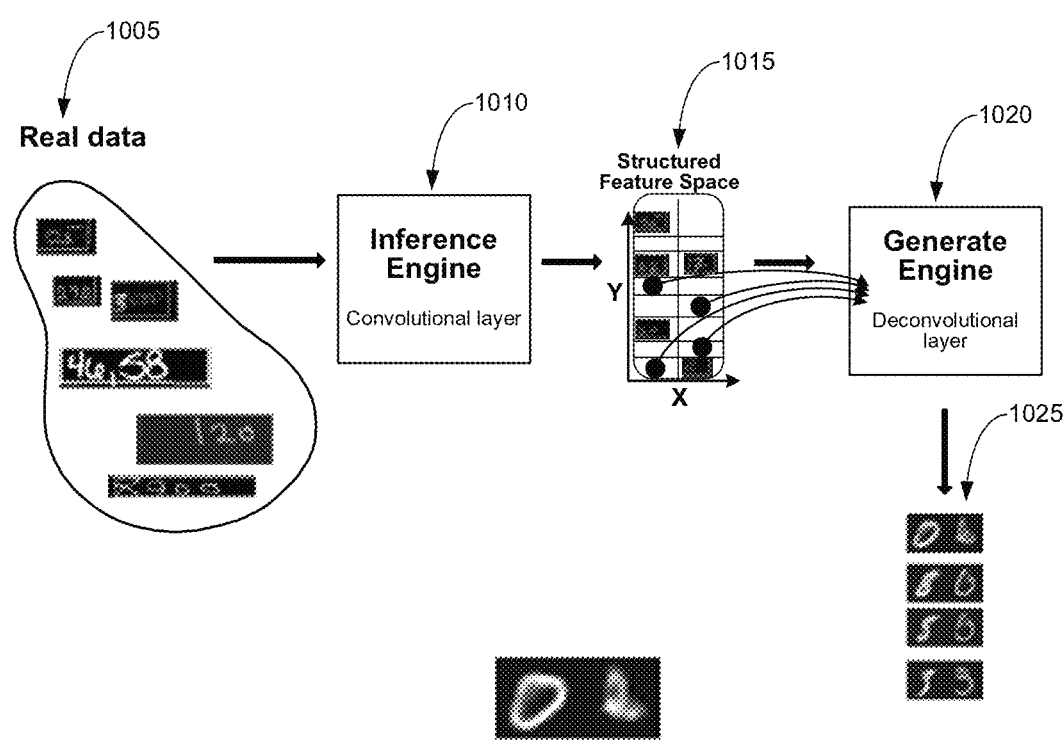
FIG. 10 is an illustration of a flow diagram of a text generator, consistent with various embodiments.
Figure 11:
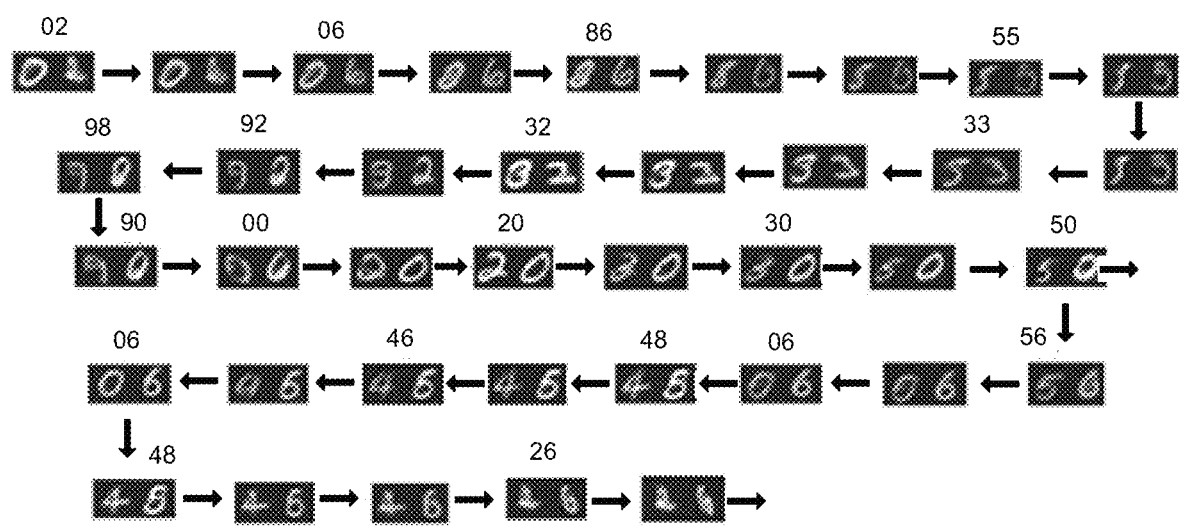
FIG. 11 is an illustration of automatically generated variations of a known shred, consistent with various embodiments.

FIG. 10 is an illustration of a flow diagram of a text generator, consistent with various embodiments. In some embodiments, the text generator is comprised of two sub models. The first model, interference engine 1010, models the structure of data, which can be shreds, by training a structured feature space which are factorial variations of data, such as input data 1005, by estimating the probabilistic distribution. Input data 1005 can be, e.g., an initial set of known shreds. Generate engine 1020 generates new variations of data based on input data 1005, such as generated data 1025, and the new variations can have a different handwriting style, a new document style, etc. The new variations can be based on sampling from data distribution of, e.g., input data 1005. Generate engine 1020 can increase or optimize the likelihood that the newly generated data or shreds will resemble real data (e.g., handwritten characters or shreds). Generate engine 1020 samples new data or shreds from trained feature space 1015. To generate data in a coherent variation style, in some embodiments, new data is sampled from a structured feature space starting from a random point, traversing the space in a continuous manner. An example of traversing the feature space for numeric data is shown in FIG. 11, where a transition across different numbers is illustrated.

Figure 12:
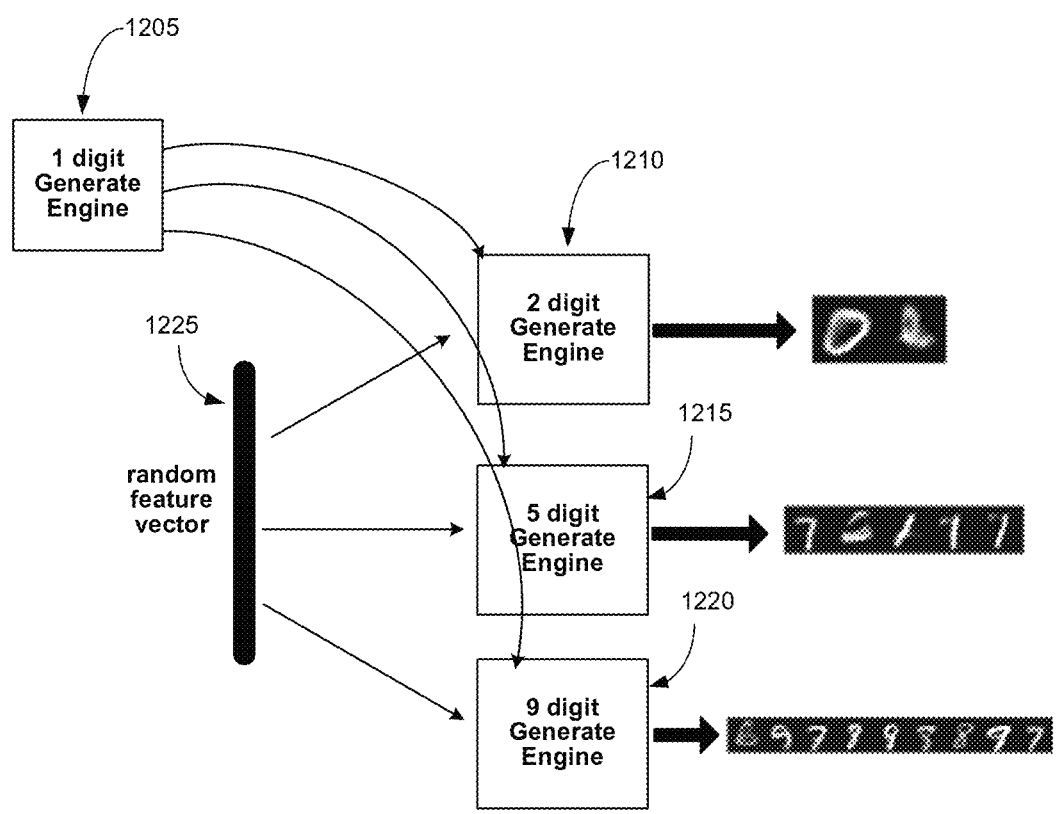
FIG. 12 is an illustration of a flow diagram of a multi-digit text generator, consistent with various embodiments.

FIG. 12 is an illustration of a flow diagram of a multi-digit text generator, consistent with various embodiments. Generating a multi-digit generator from scratch is difficult due to availability of real data for all kind of numbers or other characters. Technology disclosed here enables a multi-digit generator to be created based on one or more single-digit generators. One or more single-digit generators, such as single-digit generator 1205, can be trained based on an initial data set, such as MNIST. The MNIST data set contains many variations in handwriting styles of single digits, and can be a good initial data set. In some embodiments, to train a multi-digit generator, a combination of single-digit generators, trained differently, can be used. In some embodiments, a multi-digit text generator combines generator engines that utilize various models, such as engines 1210, 1215, and 1220. The generator engines can input the same or different randomly sampled data from trained feature space, to each engine. The output of each engine can be concatenated to form a multi-digit generator. Since the combination of several digits can form any multi-digit, the output of suggested model can generate any random number.

Figure 13:
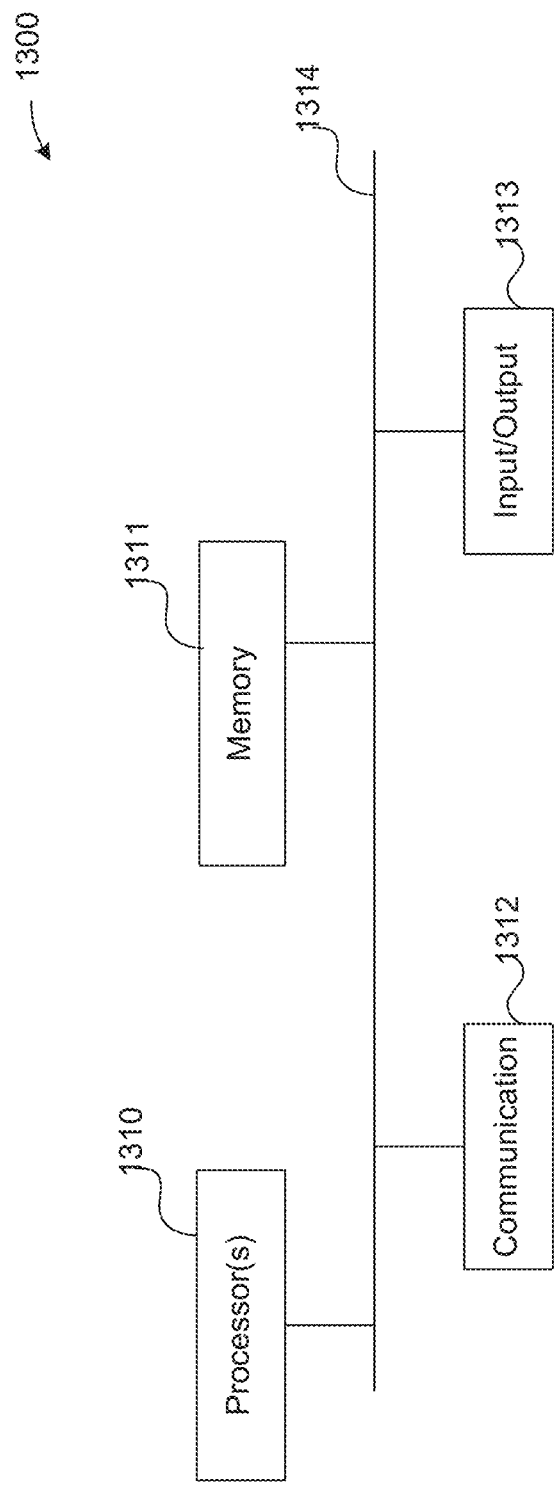
FIG. 13 is a block diagram illustrating an example of a processing system in which at least some operations described herein can be implemented, consistent with various embodiments.

FIG. 13 is a high-level block diagram illustrating an example of a processing system in which at least some operations described herein can be implemented, consistent with various embodiments. The processing system can be processing device 1300, which represents a system that can run any of the methods/algorithms described above. For example, processing device 1300 can be the computer system of FIGS. 7A-C, among others. A system may include two or more processing devices such as represented in FIG. 13, which may be coupled to each other via a network or multiple networks. A network can be referred to as a communication network.

In the illustrated embodiment, the processing device 1300 includes one or more processors 1310, memory 1311, a communication device 1312, and one or more input/output (I/O) devices 1313, all coupled to each other through an interconnect 1314. The interconnect 1314 may be or include one or more conductive traces, buses, point-to-point connections, controllers, adapters and/or other conventional connection devices. Each of the processors 1310 may be or include, for example, one or more general-purpose programmable microprocessors or microprocessor cores, microcontrollers, application specific integrated circuits (ASICs), programmable gate arrays, or the like, or a combination of such devices. The processor(s) 1310 control the overall operation of the processing device 1300. Memory 1311 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1311 may store data and instructions that configure the processor(s) 1310 to execute operations in accordance with the techniques described above. The communication device 1312 may be or include, for example, an Ethernet adapter, cable modem, Wi-Fi adapter, cellular transceiver, Bluetooth transceiver, or the like, or a combination thereof. Depending on the specific nature and purpose of the processing device 1300, the I/O devices 1313 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 1300 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

The invention claimed is:

1. A method comprising:
analyzing a plurality of shreds of a library of known shreds to model variations in handwriting style of a character of the shred; and
generating a plurality of variations the plurality of shreds based on the modeled variations of the shreds, wherein the plurality of shreds include a plurality of style differences identified via use of a deeply supervised Siamese network.

2. The method of claim 1, further comprising:
supplementing a machine learning model configured to identify content of handwritten text with the modeled variations of shreds.

3. A method for generating training data for a machine learned text recognition from previous training data comprising:
receiving image data of known character strings, the known character strings each written in a different textual style and have a same textual content;
identifying a style difference between the known character strings via use of a deeply supervised Siamese network; and
generating image data of a first character string based on one of the known character strings including an introduced variance based on the identified style difference.

4. The method of claim 3, wherein said identifying includes a plurality of textual style differences and said generating includes an image file for each of a plurality of permutations of the plurality of textual style differences.

5. The method of claim 3, wherein the style difference is a writing style of a single character of the known character strings.

6. The method of claim 3, further comprising:
determining whether the image data of the first character string has a same textual content as one of the known strings.

7. The method of claim 3, further comprising:
determining visual features of the image data of the first character string to enable comparison to other image data.

8. The method of claim 3, wherein the different textual style is based on variances in handwriting of the known character strings.

9. A system for generating training data for a machine learned text recognition from previous training data comprising:
a processor;
a memory including instructions that when executed cause the processor to:
receive a first digital image of a first known handwritten character string and a second digital image of a second known handwritten character string, wherein the first known handwritten character string and the second known handwritten character string share a first character;
generate a third digital image based on the first digital image wherein a handwritten representation of the first character of the second digital image is used in place of a handwritten representation of the first character of the first digital image; and
supplement a machine learning model configured to identify textual content of handwriting with the third digital image.

10. The system of claim 9, the memory includes further instructions for the processor to:
determine whether the first digital image including the first known handwritten character string has the same textual content as the second digital image including the second known handwritten character string.

11. The system of claim 9, wherein the first known handwritten character string and second known handwritten character string are written in a different textual style, and the style difference between the shreds includes a plurality of textual style differences and the image data of the first character string includes an image file for each of a plurality of permutations of the plurality of textual style differences.

12. A method comprising:
receiving a first digital image of a first known handwritten character string and a second digital image of a second known handwritten character string, wherein the first known handwritten character string and the second known handwritten character string share a first character;
generating a third digital image based on the first digital image wherein a handwritten representation of the first character of the second digital image is used in place of a handwritten representation of the first character of the first digital image; and
supplementing a machine learning model configured to identify textual content of handwriting with the third digital image.

13. The method of claim 12, further comprising:
receiving a fourth digital image of a third known handwritten character string, wherein the first digital image and the fourth digital image share a second character, and the third digital image further including a handwritten representation of the second character of the fourth digital image in place of a handwritten representation of the second character of the first digital image.

14. The method of claim 12, further comprising:
submitting a fourth digital image of an unknown handwritten character string to the machine learning model; and
identifying a textual content of the unknown handwritten character string via the machine learning model.

15. The method of claim 12, wherein the third digital image if further includes replaced handwritten characters from other digital images of known textual content.

16. The method of claim 12, wherein the first digital image and second digital image have a same textual content.

17. The method of claim 12, wherein the first digital image and second digital image share a second character, the method further comprising:
generating a fourth digital image based on the first digital image wherein a handwritten representation of the second character of the second digital image is used in place of a handwritten representation of the second character of the first digital image; and
supplementing a machine learning model configured to identify textual content of handwriting with the fourth digital image.

18. The method of claim 12, wherein the first digital image and second digital image share a second character, the third digital image further including a handwritten representation of the second character of the second digital image in place of a handwritten representation of the second character of the first digital image.

* * * * *